United States Patent
Huang et al.

(10) Patent No.: US 8,691,068 B1
(45) Date of Patent: *Apr. 8, 2014

(54) SOLAR METAL SULFATE-AMMONIA BASED THERMOCHEMICAL WATER SPLITTING CYCLE FOR HYDROGEN PRODUCTION

(75) Inventors: Cunping Huang, Cocoa, FL (US); Ali T-Raissi, Melbourne, FL (US); Nazim Muradov, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 971 days.

This patent is subject to a terminal disclaimer.

(21) Appl. No.: 12/267,569

(22) Filed: Nov. 8, 2008

Related U.S. Application Data

(60) Provisional application No. 60/986,820, filed on Nov. 9, 2007.

(51) Int. Cl.
*C25B 1/02* (2006.01)
*C01C 1/246* (2006.01)
*C01B 17/50* (2006.01)
*C25B 1/00* (2006.01)

(52) U.S. Cl.
CPC . *C25B 1/003* (2013.01); *C25B 1/02* (2013.01); *C01B 17/504* (2013.01)
USPC ......... 205/340; 205/637; 423/541.4; 423/356

(58) Field of Classification Search
USPC ....................................................... 423/356
See application file for complete search history.

(56) References Cited

U.S. PATENT DOCUMENTS 3,243,261 A * 3/1966 Deiters .......................... 423/356

3,882,222 A * 5/1975 Deschamps et al. .......... 423/575

(Continued)

FOREIGN PATENT DOCUMENTS

GB 1486140 * 9/1977

OTHER PUBLICATIONS

Licht, Solar Water Splitting to Generate Hydrogen Fuel: Photothermal Electrochemical Analysis, Journal of Physical Chemistry B, 2003, vol. 107, pp. 4253-4260.*

(Continued)

*Primary Examiner* — Harry D Wilkins, III

(74) *Attorney, Agent, or Firm* — Brian S. Steinberger; Phyllis K. Wood; Law Offices of Brian S. Steinberger, P.A.

(57) ABSTRACT

Two classes of hybrid/thermochemical water splitting processes for the production of hydrogen and oxygen have been proposed based on (1) metal sulfate-ammonia cycles (2) metal pyrosulfate-ammonia cycles. Methods and systems for a metal sulfate $MSO_4$—$NH_3$ cycle for producing $H_2$ and $O_2$ from a closed system including feeding an aqueous $(NH_3)_4SO_3$ solution into a photocatalytic reactor to oxidize the aqueous $(NH_3)_4SO_3$ into aqueous $(NH_3)_2SO_4$ and reduce water to hydrogen, mixing the resulting aqueous $(NH_3)_2SO_4$ with metal oxide (e.g. ZnO) to form a slurry, heating the slurry of aqueous $(NH_4)_2SO_4$ and ZnO(s) in the low temperature reactor to produce a gaseous mixture of $NH_3$ and $H_2O$ and solid $ZnSO_4(s)$, heating solid $ZnSO_4$ at a high temperature reactor to produce a gaseous mixture of $SO_2$ and $O_2$ and solid product ZnO, mixing the gaseous mixture of $SO_2$ and $O_2$ with an $NH_3$ and $H_2O$ stream in an absorber to form aqueous $(NH_4)_2SO_3$ solution and separate $O_2$ for aqueous solution, recycling the resultant solution back to the photoreactor and sending ZnO to mix with aqueous $(NH_4)_2SO_4$ solution to close the water splitting cycle wherein gaseous $H_2$ and $O_2$ are the only products output from the closed $ZnSO_4$—$NH_3$ cycle.

16 Claims, 9 Drawing Sheets

(56) References Cited

U.S. PATENT DOCUMENTS

| | | | |
|---|---|---|---|
| 4,180,550 A | * | 12/1979 | Deschamps et al. ........ 423/244.1 |
| 4,484,992 A | * | 11/1984 | Buhler et al. ............ 204/157.52 |
| 7,220,391 B1 | | 5/2007 | Huang et al. |
| 7,332,146 B1 | | 2/2008 | Huang et al. |
| 2004/0234441 A1 | * | 11/2004 | Hansen ......................... 423/356 |
| 2008/0289951 A1 | * | 11/2008 | Huang et al. ............. 204/157.52 |

OTHER PUBLICATIONS

Imenes et al., Spectral beam splitting technology for increased conversion efficiency in solar concentrating systems: a review, Solar Energy Materials & Solar Cells, 2004, vol. 84, pp. 19-69.*

Dugger et al., Ammonium Sulfate Decomposition, United States Atomic Energy Commission, International Minerals and Chemical Corporation, Feb. 1955.*

Wentworth, Thermochemical Cycles for Energy Storage: Thermal Decomposition of ZnSO4 Systems, Final Topcial Report, National Renewable Energy Laboratory, Apr. 1992.*

Raissi, "Analysis of Solar Thermochemical Water-Splitting Cycles for Hydrogen Production", Hydrogen, Fuel Cells, and Infrastructure Technologies, Dept. of Energy, FY 2003 Progress Report, Oct. 2003, pp. II-159 to II-165.*

Khaselev, O., Turner, J.A., A Monolithic Photovoltaic-Photoelectrochemical Device for Hydrogen Production via Water Splitting, Science, 1998, pp. 425-427, vol. 280, No. 5362.

Licht, S., Wang, B., Mukerji, S., Soga, T., Umeno, M., Tributsch, H., Over 18% Solar Energy Conversion for Generation of Hydrogen Fuel; Theory and Experiment for Efficient Solar Water Splitting, Int. J. of Hydrogen Energy, 2001, pp. 653-659, vol. 26.

Deutsch, T.G., Koval, C.A., Turner, J.A., III-V Nitride Epilayers for Photoelectrochemical Water Splitting: GaPN and GaAsPN, J. Phys. Chem. B., 2006, pp. 25297-25307, vol. 110.

Liu, H., Yuan, K., Shangguan, W., Photochemical Reduction and Oxidation of Water Including Sacrificial Reagents and Pt/TiO2 Catalyst, Energy and Fuels, 2006, pp. 2289-2292, vol. 20, No. 6.

T-Raissi, A., Muradov, N., Huang, C., Adebiyi, O., Hydrogen from Solar via Light-Assisted High-Temperature Water Splitting Cycles, J. Solar Energy Engineering, 2007, pp. 184-189, vol. 129.

Bilgen, E., Ducarroir, M., Foex, M., Sibieude, F., Trombe, F., Use of Solar Energy for Direct and Two-Step Water Decomposition Cycles, Int. J. Hydrogen Energy, 1977, pp. 251-257, vol. 2, No. 3.

Steinfeld, A., Solar Hydrogen Production via Two-Step Water Splitting Thermochemical Cycle Based on Zn-ZnO Redox Reaction, Int. J. Hydrogen Energy, 2002, pp. 611-619, vol. 27.

Abanades, S., Charvin, P., Flamant, G., Neveu, P., Screening of Water-Splitting Thermochemical Cycles Potentially Attractive for Hydrogen Production by Concentrated Solar Energy, Energy, 2006, pp. 2805-2822, vol. 31.

Huang, C., T-Raissi, A., A Perspective on Thermodynamics and Thermal Efficiency Calculations for Hydrogen Production via Thermochemical Water Splitting Cycles.

Steinfeld, A., Solar Thermochemical Production of Hydrogen—A Review, Solar Energy, 2005, pp. 603-615, vol. 78.

Brecher, L.E., Spewock, S., et al., Westinghouse Sulfur Cycle for the Thermochemical Decomposition of Water, Proceedings of the 1st World Hydrogen Energy Conf., 1976, pp. 1-16, 1 9A.

* cited by examiner

SOLAR METAL SULFATE-AMMONIA BASED THERMOCHEMICAL WATER SPLITTING CYCLE FOR HYDROGEN PRODUCTION

CROSS REFERENCE TO RELATED APPLICATIONS

This application claims the benefit of priority to U.S. Provisional Application No. 60/986,820 filed on Nov. 9, 2007, the entire disclosure of which is incorporated by reference in its' entirety.

GOVERNMENT LICENSE RIGHTS

This invention was made with Government support under National Aeronautics and Space Administration(NASA) Glenn Research Center contract NAG3-2751 awarded by the National Aeronautics and Space Administration(NASA). The government has certain rights in this invention.

FIELD OF THE INVENTION

This invention relates to hydrogen production and, in particular, to methods and systems for hybrid photo/thermochemical water splitting cycles that employ the quantum portion of the solar spectrum for the production of hydrogen and the thermal energy portion of solar radiation for generating oxygen.

BACKGROUND AND PRIOR ART

Production of hydrogen can be considered eco-friendly only if it is produced from a noncarboneaceous feedstock using a renewable energy source. Hydrogen production by means of water splitting using solar energy is considered the "Holy Grail" of the hydrogen economy. Water splitting can be accomplished either directly in a single step or indirectly by multiple steps. Direct thermal decomposition of water is an energy intensive process that requires temperatures over 2500° C. The main obstacle to this approach is that hydrogen and oxygen ($O_2$) evolved simultaneously in one reactor can readily recombine to form water—i.e. by back reaction. Combination of photovoltaic (PV) cells coupled to water electrolysis often serves as the benchmark solar hydrogen production process with which the performance of the other solar based hydrogen generation processes are appraised. PV cell efficiencies vary from 6% for amorphous silicon solar cells to more than 40% with multiple-junction research lab PV cells.

Solar cell energy conversion efficiencies for commercially available mono-crystalline silicon PV cells are around 14-16%. The highest efficiency PV cells such as multi junction cell based on gallium arsenide or indium selenide are still too expensive and not yet economical to use. On the other hand, water electrolysis is a well-developed technology with energy conversion efficiencies in the range of approximately 70-75%. Therefore the total solar to hydrogen efficiency of a PV-electrolysis system is in the range of 10-12%. The most commonly used PV cells only employ a portion of the solar energy (10 to 12%) while most of the solar thermal heat (88 to 90%) goes unutilized.

Unlike PV-electrolysis, water splitting processes based on the photocatalytic and photoelectrochemical methods provide a single step direct conversion of solar energy into the chemical energy of hydrogen. In the photocatalytic process, a photocatalyst converts the high-energy photons in solar spectrum into electron-hole pairs that promote redox reactions involving water to produce hydrogen and oxygen. In 1998, Khaselev and Turner reported that the hydrogen production efficiency of 12.4% for a monolithic photoelectrochemical-photovoltaic device based on the short-circuit current and the lower heating value of hydrogen as described in Khaselev O. and Turner J. A., "A Monolithic Photovoltaic-Photoelectrochemical Device for Hydrogen Production via Water Splitting," Science, 280(17), pp. 425-7, 1998. The electrolyte used by Khaselev and Turner was 3 M sulfuric acid aqueous solution and the high cell output could only be maintained for less than 34 minutes after which the efficiency began to drop precipitously. According to Licht, S., Wang, B., Mukerji, S., Soga, T., Umeno, M. and Tributsch, H., "Over 18% Solar Energy Conversion for Generation of Hydrogen Fuel; Theory and Experiment for Efficient Solar Water Splitting," Int. J. of Hydrogen Energy, 26, pp. 653-659, 2001, Licht and co-workers reported a solar to hydrogen energy conversion efficiency of more than 18% using a multi-junction photoelectrode in 1M $HClO_4$ electrolyte and an artificial light source with Air Mass 0 (AM0) filter radiating with an intensity of 135 $mW/cm^2$. However, no information was given with regard to the photo-electrode life in their work.

Thermodynamically, water splitting requires a minimum Gibbs free energy of 237.1 kJ per mole of water decomposed at 25° C. and 1 atm of pressure corresponding to 1.229 eV. Considering prevailing over potentials, water splitting requires upwards of 2.0 V or above. In a solar photocatalytic process, this implies the requirement for a wide band gap of greater than 2.0 eV photocatalyst. There are conflicting requirements for what makes a suitable photocatalyst in conducting water splitting reactions. In order to utilize the solar spectrum as broadly as possible, a semiconductor with narrow band gap energy is needed, however, electron-hole pairs generated by a low band gap semiconductor do not possess sufficient redox potential to engender water splitting that normally requires at least 2.0 eV of energy.

In case of a wide band gap semiconductor such as $TiO_2$ (band gap energy of 3.0 eV) only a small portion of solar spectrum would be absorbed. Thus, for a semiconductor photocatalyst to be useful for water splitting, it must have several attributes as follows 1) its band gap must be wider than about 1.7 eV; 2) it must have a suitable minority band edge and Fermi level that cover both $H_2$ and $O_2$ evolution potentials; 3) it must be stable in very acidic or very alkaline solutions; 4) it must possess high efficiency for conversion of photons to electron-hole pairs; and 5) electron-hole pairs must be able to rapidly migrate to the semiconductor surface where redox reactions can readily occur thwarting charge recombination as described in Deutsch, T. G., Koval, C. A. and Turner J. A., "III-V Nitride Epilayers for Photoelectrochemical Water Splitting: GaPN and GaAsPN," J. Phys. Chem. B, 110, pp. 25297-307, 2006. Moreover, these conditions have to be met simultaneously. To date, no such catalyst has been found.

Another approach to direct water splitting involves the use of sacrificial reagents—see, for example, the review by Liu and co-workers as described in Liu, H., Yuan, J., and Shangguan, W., "Photochemical Reduction and Oxidation of Water Including Sacrificial Reagents and Pt/TiO2 Catalyst," Energy & Fuels, 20(6), pp. 2289-92, 2006. The central premise in this approach is that lower potentials would be necessary to evolve hydrogen if a sacrificial reagent is present as opposed to that required for direct unassisted water splitting. Therefore, the efficiency of $H_2$ or $O_2$ production from such systems can be significantly higher than direct water splitting. Several redox systems have been extensively investigated including electron donor systems such as: $CH_3OH$ or $C_2H_5OH$, $Na_2EDTA$, $Na_2SO_3$, $Na_2S$ and NaI or KI; as well as the electron scavenger systems, e.g. $AgNO_3$ and $Fe(NO_3)_3$.

Although sacrificial reagent redox systems require lesser energy and can be carried out under milder conditions, a consumable reagent is required to produce hydrogen (or oxygen) from water. Only $H_2SO_3$—$H_2SO_4$ system can form a closed cycle if the problem with sulfur formation during $H_2SO_3$ oxidation can be satisfactorily addressed.

Thermochemical water splitting cycles (TCWSCs) utilize two or more chemical reactions (steps) that together form a closed loop with an overall reaction being the splitting of water and co-production of hydrogen and oxygen. Energy is typically input into one or more steps constituting a TCWSC. The basic concept behind the use of TCWSCs is to partition the total energy required for splitting water into several smaller and more manageable quantities input into the various steps within the cycle so that each step requires a portion of the total water splitting energy needed ($\Delta H°_{w,liquid}$=285.9 kJ/mol and $\Delta H°_{w,gas}$=241.83 kJ/mol at 25° C., 1 atm). FIG. 1 illustrates a three-step TCWSC in which the total energy ($\Delta H_w$) required for water splitting is segmented as follows:

$$\Delta H_w = \Delta H_1 + \Delta H_2 + \Delta H_3 \quad (1)$$

Each step requires lesser amount of energy than the total water splitting energy as follows:

$$\Delta H_1 < \Delta H_w;\ \Delta H_2 < \Delta H_w;\ \Delta H_3 < \Delta H_w. \quad (2)$$

At least two steps are needed to form a TCWSC: $H_2$ evolution step and $O_2$ production step. If the energy required for one step of a TCWSC (typically, the oxygen evolving step) becomes greater than that needed to carry out direct water splitting, i.e. $\Delta H_i > \Delta H_w$, it implies that the cycle is a pseudo TCWSC. Since more energy than that needed for direct water splitting is typically stored in the products from oxygen generation step, hydrogen production step of the cycle can be considerably less energy intensive or even exothermic. Pseudo TCWSCs constitute a highly endothermic process for absorbing and storing the solar thermal heat at very high temperatures by use of solar cavity-receivers operating at temperatures above 2000° C. and mean solar flux concentration ratios, $C_R$, exceeding 5000 as described in T-Raissi, A., Muradov, N., Huang, C. and Adebiyi, O., "Hydrogen from Solar via Light-Assisted High-Temperature Water Splitting Cycles," J. Solar Energy Engineering, 129, pp. 184-9, 2007.

Unlike direct thermal decomposition of water that requires high temperature separation of $O_2$ from $H_2$, pseudo TCWSCs need to separate oxygen from an oxide (CO or $M_xO_y$) and a metal vapor to stop reverse reactions. Rapid quenching can help reduce the recombination rate of the products formed. FIG. 2 depicts the concept of pseudo TCWSCs having one step that consumes more energy than that needed for direct water splitting. There are three classes of pseudo TCWSCs: nonmetal oxide, metal/metal oxide and metal oxide/metal oxide cycles as described in Bilgen, E., Ducarroir, M., Foex, M., Sibieude, F., and Trombe, F., "Use of Solar Energy for Direct and Two-Step Water Decomposition Cycles," Int. J. Hydrogen Energy, 2(3), pp. 251-7, 1977; Steinfeld, A., "Solar Hydrogen Production via Two-Step Water Splitting Thermochemical Cycle Based on Zn/ZnO Redox Reaction," Int. J. Hydrogen Energy, 27, pp. 611-9, 2002; and Abanades, S., Charvin, P., Flamant, G., and Neveu, P., "Screening of Water-Splitting Thermochemical Cycles Potentially Attractive for Hydrogen Production by Concentrated Solar Energy", Energy, 31, pp. 2805-22, 2006.

Nonmetal Oxide Cycles:

$$CO_2(g) = CO(g) + \tfrac{1}{2}O_2(g),\ \Delta H = 283.0\text{ kJ/mol},\ 1700°\text{ C}. \quad (3)$$

$$CO(g) + H_2O(g) = H_2(g) + CO_2(g),\ \Delta H = -41.2\text{ kJ/mol},\ 700°\text{ C}. \quad (4)$$

$$SiO_2 \rightarrow SiO(g) + \tfrac{1}{2}O_2\ 2977°\text{ C}. \quad (5)$$

$$SiO(g) + H_2O \rightarrow SiO_2 + H_2\ 2656°\text{ C}. \quad (6)$$

Reaction (3) requires higher energy than that needed for direct water thermolysis, $\Delta H°_{w,gas}$=241.83 kJ/mol.

Metal/Metal Oxide TCWSCs:

$$M_xO_y = xM + (y/2)O_2,\ \text{(endothermic)},\ \Delta H° > \Delta H°_W \quad (7)$$

$$xM + yH_2O = M_xO_y + yH_2;\ \text{(exothermic)},\ \Delta G < 0 \quad (8)$$

Some metal and metal oxide based pseudo TCWSCs described in Abanades et al. are given below:

$$MoO_2(s) \rightarrow Mo + O_2\ 3713°\text{ C}. \quad (9)$$

$$Mo + 2H_2O \rightarrow MoO_2(s) + 2H_2\ 1543°\text{ C}. \quad (10)$$

$$WO_3(s) \rightarrow W + 3/2 O_2\ 3910°\text{ C}. \quad (11)$$

$$W + 3H_2O \rightarrow WO_3(s) + 3H_2\ 884°\text{ C}. \quad (12)$$

$$SnO_2 \rightarrow Sn + O_2\ 2650°\text{ C}. \quad (13)$$

$$Sn + 2H_2O \rightarrow SnO_2 + 2H_2\ 600°\text{ C}. \quad (14)$$

$$ZnO \rightarrow Zn + \tfrac{1}{2}O_2\ 2000°\text{ C}. \quad (15)$$

$$Zn + H_2O \rightarrow ZnO + H_2\ 100°\text{ C}. \quad (16)$$

Some low temperature metal/metal oxide cycles do not belong to pseudo TCWSCs described in Abanades et al. include:

$$Hg(g) + H_2O \rightarrow HgO(s) + H_2\ 360°\text{ C}. \quad (17)$$

$$HgO(s) \rightarrow Hg(g) + \tfrac{1}{2}O_2\ 600°\text{ C}. \quad (18)$$

$$Cd(s) + H_2O \rightarrow CdO(s) + H_2,\ \text{electrolytic},\ 25°\text{ C}. \quad (19)$$

$$CdO(s) \rightarrow Cd(g) + \tfrac{1}{2}O_2\ 1400°\text{ C}. \quad (20)$$

The above two cycles use heavy metals Hg and Cd and generally viewed as not environmentally friendly cycles.

Metal Oxide/Metal Oxide TCWSCs:

$$In_2O_3 \rightarrow In_2O + O_2\ 2200°\text{ C}. \quad (21)$$

$$In_2O + 2H_2O \rightarrow In_2O_3 + 2H_2\ 800°\text{ C}. \quad (22)$$

$$Fe_3O_4(s) \rightarrow 3FeO(s) + \tfrac{1}{2}O_2\ 2200°\text{ C}. \quad (23)$$

$$3FeO(s) + H_2O \rightarrow Fe_3O_4S(s) + H_2\ 400°\text{ C}. \quad (24)$$

$$Ni_{0.5}Mn_{0.5}Fe_2O_4 \rightarrow Ni_{0.5}Mn_{0.5}Fe_2O_{4-x} + (x/2)O_2\ 1100°\text{ C}. \quad (25)$$

$$Ni_{0.5}Mn_{0.5}Fe_2O_{4-x} + xH_2O \rightarrow Ni_{0.5}Mn_{0.5}Fe_2O_4 + xH_2\ 600°\text{ C}. \quad (26)$$

$$MnFe_2O_4 + 3CaO + (1-x)H_2O \rightarrow Ca_3(Fe,Mn)_3O_{8-x} + (1-x)H_2\ 1000°\text{ C}. \quad (27)$$

$$Ca_3(Fe,Mn)_3O_{8-x} \rightarrow MnFe_2O_4 + 3CaO + \tfrac{1}{2}(1-x)O_2\ 600°\text{ C}. \quad (28)$$

The overall thermal efficiency ($\eta_{overall}$) (or $1^{st}$ law efficiency) of a TCWSC is defined as the ratio of hydrogen chemical energy to total energy consumed by the cycle.

$$\eta_{overall} = \frac{n \cdot \Delta H°_f}{\Delta H_{total}} \quad (29)$$

Where n is the total mole of hydrogen generated by the cycle, $\Delta H°_f$ is enthalpy of water formation and $\Delta H_{total}$ is the total energy input to the cycle to produce n moles of hydrogen. If the enthalpy formation of water in liquid state is used (at 298 K, $\Delta H_f$=−68.32 kcal/mol=285.9 kJ/mol), the efficiency thus calculated is called high heating value (HHV) efficiency, η(HHV). Some argue that the latent heat of condensation cannot be economically recovered and prefer using the low heating value (LHV) efficiency η(LHV) in which $\Delta H°_f$ is the enthalpy of formation of water vapor at 298 K ($\Delta H°_f$=−57.41 kcal/mol=240.2 kJ/mol). The ratio η(HHV)/(LHV)=68.32/54.74=1.19. The figure of merit or Carnot efficiency (also, work or $2^{nd}$ law efficiency) is defined as:

$$\eta(w) = \frac{n \cdot \Delta G°_f}{\Delta H_{total}} = \frac{237.2 \cdot n}{\Delta H_{total}} \quad (30)$$

Where, $\Delta G°_f$ is the Gibbs free energy of water formation (237.2 kJ/mol). Since early 1970s, when the concept of TCWSCs was introduced, much effort has been devoted to defining their efficiencies.

However, due to the fact that TCWSCs often contain several reaction steps as well as processes for the material transport and separation, precise determination of the efficiencies has been difficult. Inventors, Huang and Raissi have shown that efficiency determination for a TCWSC must be calculated based on the chemical process simulation in which a detailed flow sheet that takes into account for the material and energy balance as well as precise values of the chemical and physical properties of reactants and products as described in Huang, C., and T-Raissi, A., "A Perspective on Thermodynamics and Thermal Efficiency Calculations for Hydrogen Production via Thermochemical Water Splitting Cycles," manuscript t to be submitted for publication.

FIG. 3 shows a simple flow diagram for a model TCWSC. Water is fed into the cycle and hydrogen and oxygen are the only output of the cycle. The hydrogen and oxygen production steps are connected by process steps involving chemical separation and recycling thus forming a closed cycle with an overall reaction of water decomposition into $H_2$ and $O_2$. Total energy needed to perform water splitting consists of four parts: energies required to generate $H_2$ and $O_2$ (i.e. $\Delta H_1$ and $\Delta H_2$), separation of reactant from products ($\Delta H_S$) and recycling of the reactants ($\Delta E$). Then, $$\Delta H_{Total} = \Delta H_1 + \Delta H_2 + \Delta H_S + \Delta E \quad (30)$$

The efficiency of a TCWSPC depends upon if energy input to the cycle is maximally used for carrying out chemical reactions at same time minimizing the energy losses. There are a number of types of energy losses for TCWSPCs leading to a wide range of efficiency loss. In order to develop an innovative TCWSPC, it is important to analyze and evaluate the existing TCWSPCs in terms of energy losses. The energy losses in a TCWSPC can be separated into four major categories as follows:

1. Kinetic energy loss: this includes reaction activation energy, mass transportation energy and energy to overcome reverse reactions.
2. Heating energy loss: 100% heat recovery can not be achieved. Low temperature heating energy is not recoverable.
3. Separation energy loss: energy required to separate one product from another or from reactants is not recoverable. Separation of gas from gas or liquid from liquid is an energy intensive process. While separating a solid from another solid is extremely difficult or almost impossible.

4. Transport energy loss which is electrical energy used to pump and move species.

It should be pointed out that heating energy can be recovered. From a viewpoint of chemical reactions, the efficiency of a TCWSPC can also be expressed as:

$$\eta = (\Delta H_{reaction})/\Delta H_{total} \times 100 = (\Delta H_{total} - \Delta H_{kinetics} - \Delta E_{transportation} - \Delta H_{heat\ loss} - \Delta H_{separation})/\Delta H_{total} \times 100$$

Transportation energy requirements for a TCWSPC consists a small portion of the total energy needed. On the other hand, heating energy loss can be minimized using a heat exchanger network. Pinch analysis can provide an optimization technique for heat exchange network with which heating loss can be minimized. Therefore, in most TCWSPCs, kinetic energy and separation energy represent major portions of the energy loess. If chemical reactions in a TCWSPC can be approximately reach their thermodynamic equilibria, the kinetic energy loss can be neglected. However, the major issues for most high temperature reactions are reverse reactions that require a quenching step to cool temperature rapidly to avoid this reaction, for example:

$CO_2(g) = CO(g) + 0.5O_2(g)$ $ZnO(s) = Zn(g) + 0.5O_2(g)$ $SnO_2 \rightarrow Sn + O_2$ Apparently, separating one gas from a gas mixture and a liquid from a solution is not only an energy intensive process it also can cause material losses. For example, separation of $SO_2$ from $O_2$ requires a compression process to liquefy $SO_2$ so that $O_2$ can be separated. The $O_2$ separated in this method can contain small amounts of $SO_2$, indicating the loss of sulfur component. To separate $H_2$ from $CO_2$ in $CO_2$—CO cycle (Reaction (4)) may need a Pressure Swing Adsorption process that can cause hydrogen loss. Separating $H_2O$ from $H_2SO_4$ is another typical example of liquid and liquid separation that involves in all the sulfuric acid decomposition based TCWSPCs. The separation represents a major energy loss and determines the efficiency of the entire cycle. Some TCWSPCs comprise a step of separating a solid from a solid mixture indicating that the operation is complicated and the cycle efficiency is low. Based upon the energy loss analyses, the cycle efficiency can be estimated as:

$$\eta = (\Delta H_{reaction})/\Delta H_{total} \times 100 \ (\Delta H_{total} - \Delta H_{kinetic} - \Delta H_{separation})/\Delta H_{total} \times 100$$

As reported in the literature, since the decomposition of $H_2SO_4$ and $MSO_4$ at higher temperatures can reach thermodynamic equilibria, the kinetic energy loss can be neglected, therefore, the efficiency of $H_2SO_4$ and $MSO_4$ based TCWSPCs can be simplified as:

$$\eta = (\Delta H_{reaction})/\Delta H_{total} \times 100 \approx (\Delta H_{total} - \Delta H_{separation})/\Delta H_{total} \times 100$$

This partially shows why $H_2SO_4$ and $MSO_4$ based TCWSPCs are high efficiency processes and therefore are widely studied.

The oxygen producing step in the sulfur family cycles is the decomposition of sulfuric acid or a metal sulfate. The energy required for generating hydrogen and oxygen from water is immense (286 kJ/mol). However, the energy input for the decomposition of $H_2SO_4$, calculated using Thermfact and GTT-Technologies FactSage™ 5.5 thermochemical software, is only about 80.9% of the total energy required for water splitting (i.e. 286 kJ/mol):

| | |
|---|---|
| $H_2SO_4 = H_2O + SO_3$ | $\Delta H°\ 298K = 87.1$ kJ/mol |
| $SO_3 = SO_2 + \frac{1}{2}O_2$ | $\Delta H°\ 298K = 144.2$ kJ/mol | for which the overall reaction is:

| | |
|---|---|
| $H_2SO_4 = H_2O + SO_2 + \frac{1}{2}O_2$ | $\Delta H°\ 298K = 231.3$ kJ/mol |

The remaining 19.1% of the energy required to split water is then used for the $H_2$ production step. Note that about 80.9% of the total solar irradiance comprising of mostly thermal energy with wavelengths above 520 nm can be utilized for the decomposition of sulfuric acid in the oxygen generation step of the sulfur-family cycles. The remaining 19.1% of the total solar irradiance which is photonic energy at wavelengths less than about 520 nm will be used for the hydrogen production step of the cycle. In other words, for optimum overall cycle efficiency, it is necessary that the oxygen production step to utilize 80.9% of the solar irradiance as mostly thermal radiation above a wavelength of approximately 520 nm and the hydrogen generation step to consume the remaining 19.1% of solar power, at wavelengths shorter than 520 nm—preferably, within a photolytic and/or photocatalytic reactor.

Large-scale solar concentrators typically utilize parabolic reflectors in the form of trough, tower, or dish systems. These solar concentrators are characterized in terms of their mean flux concentration ratio $C_R$ over an area $S_a$ at the receiving focal plane as follows:

$$C_R = q_s/I$$

where $q_s$ (W/m²) refers to the solar flux intercepted by unit area of the receiver at the focal plane and I (W/m²) is the incident normal beam isolation. $C_R$ is often expressed in units of "suns" when normalized to I=1000 W/m² as described in Steinfeld, A., "Solar Thermochemical Production of Hydrogen—A Review," Solar Energy, 78, pp. 603-15, 2005. The solar flux concentration ratio typically obtained is at the level of 100, 1000, and 10,000 suns for trough, tower, and dish systems, respectively. The most suitable concentrators for applications involving solar thermochemical water splitting cycles include tower and dish systems.

Due to the high 1$^{st}$ and 2$^{nd}$ law efficiencies of sulfuric acid based cycles, to date, more than 20 sulfuric acid and/or metal sulfate decomposition based TCWSCs have been reported in the literature. Despite difficulties that challenge efficient electrolytic oxidation of sulfur dioxide ($SO_2$), the Westinghouse hybrid cycle still remains as one of the most studied TCWSCs conceived for the production of hydrogen from water. The Westinghouse cycle described in Brecher, L. E., Spewock, S., et al., "Westinghouse Sulfur Cycle for the Thermochemical Decomposition of Water," Proceedings of the 1st World Hydrogen Energy Conf., 1 9A, 1-16, 1976 is as follows:

$$SO_2(g)+2H_2O(l)=H_2+H_2SO_4(aq)\ 77°\ C.\ (electrolysis) \quad (31)$$

$$H_2SO_4(g)=SO_2(g)+H_2O+\frac{1}{2}O_2\ 850°\ C.\ (thermolysis) \quad (32)$$

The many advantages of the Westinghouse cycle have been widely reported and discussed in the literature. Westinghouse cycle is known to be hampered by the low solubility of $SO_2$ in water and challenges presented by the acidity of the $SO_2$ electrolytic oxidation process. To date, many efforts have been made to improve the efficiency of the electrolytic process for oxidation of $SO_2$. Past activities have involved the use of a depolarized electrolyzer as well as addition of a third process step—examples include S—I, S—Br and S—Fe cycles given below:

Ispra Mark 13 Sulfur-Bromine Cycle:

$$Br_2(l)+SO_2(g)+2H_2O(l)\rightarrow 2HBr(aq)+H_2SO_4(aq)\ 77°\ C. \quad (33)$$

$$H_2SO_4(g)\rightarrow SO_2(g)+H_2O(g)+\frac{1}{2}O_2(g)\ 850°\ C. \quad (34)$$

$$2HBr(aq)\rightarrow Br_2(aq)+H_2(g)\ (electrolysis)\ 77°\ C. \quad (35)$$

General Atomics' Sulfur-Iodine Cycle:

$$I_2+SO_2(g)+2H_2O(l)\rightarrow 2HI(a)+H_2SO_4(aq)\ 100°\ C. \quad (36)$$

$$H_2SO_4(g)\rightarrow SO_2(g)+H_2O(g)+\frac{1}{2}O_2(g)\ 850°\ C. \quad (37)$$

$$2HI\rightarrow I_2(g)+H_2(g)\ 450°\ C. \quad (38)$$

Sulfur-Iron Cycle:

$$Fe_2(SO_4)_3(aq)+SO_2+2H_2O\rightarrow 2FeSO_4(aq)+2H_2SO_4\ 25°\ C. \quad (39)$$

$$H_2SO_4(l)\rightarrow SO_2(g)+H_2O(g)+\frac{1}{2}O_2(g)\ 850°\ C. \quad (40)$$

$$2FeSO_4(aq)+H_2SO_4(aq)\rightarrow Fe_2(SO_4)_3(aq)+H_2(g)\ 25°\ C. \quad (41)$$

Although these cycles address some of the challenges associated with water splitting, especially with regard to the solubility of $SO_2$ in water, they have issues of their own. For example, efficient separation of sulfuric acid from reaction products such as HI, HBr or $FeSO_4$ presents a challenge. Additionally, the pH of the solutions remains problematic. In fact, this problem becomes more acute due to the generation of other acids such as HI and HBr.

The second approach is to introduce a metal oxide as a catalyst to convert low concentration sulfuric acid to metal sulfate that can be decomposed for the production of oxygen and sulfur dioxide, metal oxide. Sulfur dioxide and water are send back to sulfur decomposition based TCWSPCs for the production of hydrogen and sulfuric acid to close a cycle. Introducing ZnO into the Westinghouse TCWSPC a new modified $ZnSO_4$ decomposition based Westinghouse cycle can be written as:

$$SO_2(g)+2H_2O(l)=H_2+H_2SO_4(aq)\ 77°\ C.\ (electrolysis) \quad (66)$$

$$H_2SO_4(aq,\ 50\ wt\%)+ZnO(s)=ZnSO_4.H_2O(s)\ 80\sim 350°\ C. \quad (67)$$

$$ZnSO_4.H_2O(s)=ZnSO_4(s)+H_2O(g)\ 450°\ C. \quad (68)$$

$$ZnSO_4(s)=SO_2(g)+\frac{1}{2}O_2+ZnO(s)\ 850°\ C. \quad (69)$$

Similarly, by adding metal oxide catalysts to the Ispra Mark 13 sulfur-bromine cycle, General Atomics' sulfur-iodine cycle and sulfur-iron cycle, a number of new, modified metal sulfate based TCWSCs can be devised. However, if solar energy is use to drive these cycles, only solar thermal energy can be utilized resulting in degrading the photonic portion of solar spectrum to lower grade heat. Secondly, although metal sulfate cycles have overcome some difficulties associated with the sulfuric acid based TCWSPCs, they have some other issues that need to be addressed. A fundamental difficulty of this type of TCWSPCs is that the hydrogen production step:

$$MO(s)+H_2O+SO_2(g)\rightarrow MSO_4(s)+H_2(g)$$

is thermodynamically unfavorable. Besides that, the separation of $H_2$ from unreacted $SO_2(g)$ is an energy intensive process.

For solar driven water splitting, Abanades and co-workers screened 280 TCWSCs as disclosed in Abanades, S., Charvin, P., Flamant, G., and Neveu, P., "Screening of Water-Splitting Thermochemical Cycles Potentially Attractive for Hydrogen Production by Concentrated Solar Energy", Energy, 31, 2805-22, 2006. They selected 30 TCWSCs as promising solar driven cycles for further investigation. Among these cycles, there were nine metal sulfate based TCWSCs—almost ⅓ of all selected cycles. This implies that the decomposition of $H_2SO_4$ or $MSO_4$ presents an effective method for heat absorbing step of the TCWSCs. The General Atomics' S—I cycle was not among the selected candidates considered suitable for solar interface by Abanades et al due to the difficulties in separating HI from water. Three examples of metal sulfate cycles are given below:

$$MnSO_4 \rightarrow MnO + SO_2 + \tfrac{1}{2}O_2 \; 1100° \text{ C.} \tag{42}$$

$$MnO + H_2O + SO_2 \rightarrow MnSO_4 + H_2 \; 250° \text{ C.} \tag{43}$$

$$FeSO_4 \rightarrow FeO + SO_2 + \tfrac{1}{2}O_2 \; 1100° \text{ C.} \tag{44}$$

$$FeO + H_2O + SO_2 \rightarrow FeSO_4 + H_2 \; 250° \text{ C.} \tag{45}$$

$$CoSO_4 \rightarrow CoO + SO_2 + \tfrac{1}{2}O_2 \; 1100° \text{ C.} \tag{46}$$

$$CoO + H_2O + SO_2 \rightarrow CoSO_4 + H_2 \; 250° \text{ C.} \tag{47}$$

$$3FeO(s) + H_2O \rightarrow Fe_3O_4(s) + H_2 \; 200° \text{ C.} \tag{48}$$

$$Fe_3O_4(s) + FeSO_4 \rightarrow 3Fe_2O_3(s) + 3SO_2(g) + \tfrac{1}{2}O_2 \; 800° \text{ C.} \tag{49}$$

$$3Fe_2O_3(s) + 3SO_2(g) \rightarrow 3FeSO_4 + 3FeO(s) \; 1800° \text{ C.} \tag{50}$$

$$3FeO(s) + H_2O \rightarrow Fe_3O_4(s) + H_2 \; 200° \text{ C.} \tag{51}$$

$$Fe_3O_4(s) + 3SO_3 \rightarrow 3FeSO_4(g) + \tfrac{1}{2}O_2 \; 800° \text{ C.} \tag{52}$$

$$FeSO_4 \rightarrow 3FeO(s) + SO_3 \; 2300° \text{ C.} \tag{53}$$

$$Fe_2O_3(s) + 2SO_2(g) + H_2O \rightarrow 2FeSO_4(s) + H_2 \; 200° \text{ C.} \tag{54}$$

$$2FeSO_4(s) \rightarrow 3Fe_2O_3(s) + SO_2(g) + SO_3(g) \; 700° \text{ C.} \tag{55}$$

$$SO_3(g) \rightarrow SO_2(g) + \tfrac{1}{2}O_2 \; 2300° \text{ C.} \tag{56}$$

$$6Cu(s) + 3H_2O \rightarrow 3Cu_2O(s) + 3H_2 \; 500° \text{ C.} \tag{57}$$

$$Cu_2O(s) + 2SO_2(g) + 1.5O_2 \rightarrow 2CuSO_4 \; 300° \text{ C.} \tag{58}$$

$$2Cu_2O(s) + 2CuSO_4 \rightarrow 6Cu(s) + 2SO_2 + 3O_2 \; 1750° \text{ C.} \tag{59}$$

$$Cu_2O(s) + H_2O(g) \rightarrow Cu(s) + Cu(OH)_2 \; 1500° \text{ C.} \tag{60}$$

$$Cu(OH)_2 + SO_2(g) \rightarrow CuSO_4 + H_2 \; 100° \text{ C.} \tag{61}$$

$$CuSO_4 + Cu(s) \rightarrow Cu_2O(s) + SO_2 + \tfrac{1}{2}O_2 \; 1500° \text{ C.} \tag{62}$$

$$SO_2 + H_2O + BaMoO_4 \rightarrow BaSO_3 + MoO_3 + H_2O \; 300° \text{ C.} \tag{63}$$

$$BaSO_3 + H_2O \rightarrow BaSO_4 + H_2 \tag{64}$$

$$BaSO_4(s) + MoO_3(s) \rightarrow BaMoO_4(s) + SO_2(g) + \tfrac{1}{2}O_2 \; 1300° \text{ C.} \tag{65}$$

The methods and systems of the present invention provide a class of new thermochemical water splitting cycles that utilize solar photonic energy for the production of hydrogen and solar thermal heat for oxygen production.

SUMMARY OF THE INVENTION

A primary objective of the present invention is to introduce the concept of a new type of solar thermochemical water splitting cycles for hydrogen production. In these cycles, both solar photonic energy and solar thermal energy are utilized ensuring higher cycle efficiencies. The cycles match the energy content of solar spectrum to the energy requirements of these cycles.

A secondary objective of the invention is to provide methods and systems for a hybrid photo/thermo-chemical water splitting cycle that employs the quantum portion of the solar spectrum for the production of $H_2$ and the thermal portion (i.e., IR) portion of solar radiation for $O_2$ evolution.

A third objective of the invention is to provide methods and systems for using the full solar spectrum allows the cycle to reach potentially a higher overall efficiency than is possible with the purely thermochemical water splitting cycles of the past.

A fourth objective of the invention is to provide methods and systems for a hybrid photo/thermo-chemical water splitting cycle using the metal sulfate-ammonia ($MSO_4$—$NH_3$) hybrid photo/thermochemical cycle represented by the following four reactions:

$$SO_2(g) + 2NH_3(g) + H_2O(l) \rightarrow (NH_4)_2SO_3(aq) \; 25° \text{ C.} \text{ (chemical absorption)} \tag{a}$$

$$(NH_4)_2SO_3(aq) + H_2O(l) \rightarrow (NH_4)_2SO_4(aq) + H_2 \; 30{\sim}80° \text{ C. (solar photocatalytic and/or electrolytic step)} \tag{b}$$

$$(NH_4)_2SO_4(s) + MO(s) \rightarrow 2NH_3(g) + MSO_4(s) + H_2O(g) \; 400° \text{ C. (thermocatalysis)} \tag{c}$$

$$MSO_4(s) \rightarrow SO_2(g) + MO(s) + \tfrac{1}{2}O_2 \; 850{\sim}1100° \text{ C. (thermocatalysis)} \tag{d}$$

Where, M is preferably Zn and Mn. Additionally, M can also be selected from the group consisting of Mg, Ca, Ba, Fe, Co, Ni, Cu and Pb. Also, oxides $Fe_2O_3$ and $Cu_2O$ can be included for by slightly modifying Reactions (d) and (d). One main feature of the new $MSO_4$—$NH_3$ cycles is that no separation unit operations are needed. It is obvious that for the $H_2$ production step, gaseous $H_2$ is generated from the aqueous solution and no separation is required. In a low temperature reaction, gaseous products, $NH_3$ gas and water vapor, can be separated automatically from solid product $ZnSO_4$, which decomposes at temperatures above 600° C. A gaseous mixture containing $SO_2$ and $O_2$ is generated from solid $ZnSO_4$ at temperatures higher than 800° C. and they can be easily separated from solid product ZnO.

The separation of $SO_2$ from $O_2$ is accomplished by a chemical absorption step, where $SO_2$ reacts with $NH_3$ and $H_2O$ to form aqueous $(NH_4)_2SO_3$ solution, and therefore $O_2$ is separated.

A first preferred embodiment of the invention provides a method for a $ZnSO_4$—$NH_3$ cycle for producing $H_2$ and $O_2$ from a closed system including feeding an aqueous $(NH_3)_4SO_3$ solution into a photocatalytic reactor to oxidize the aqueous $(NH_3)_4SO_3$ into aqueous $(NH_3)_2SO_4$ and reduce water to hydrogen, mixing the resulting aqueous $(NH_3)_2SO_4$ with ZnO powder, heating the slurry in the low temperature reactor to produce a gaseous mixture of $NH_3$ and $H_2O$, and solid $ZnSO_4$ that is heated in at a high temperature reactor to produce a gaseous mixture of $SO_2$ and $O_2$ and ZnO, mixing the gaseous mixture of $SO_2$ and $O_2$ with the $NH_3+H_2O$ stream in an absorber to form aqueous $(NH_4)_2SO_3$ solution and separate $O_2$ from the solution. The aqueous $(NH_4)_2SO_3$ is sent back to the photoreactor to close the water splitting cycle wherein gaseous $H_2$ and $O_2$ are the only output products from the closed $ZnSO_4$—$NH_3$ cycle. This process can also be done by an electrolytic process to oxidize aqueous $(NH_4)_2SO_3$ solution to $(NH_4)_2SO_4$ solution and reduce water to produce hydrogen.

In an embodiment, the method also includes introducing a cold water stream into the closed system to recover heat from the high temperature reactor to generate a hot stream; and using the hot steam to drive a microturbine to produce electricity.

A second embodiment provides a closed system for producing $H_2$ and $O_2$ via $M_2SO_7$—$NH_3$ water splitting cycles. Just as metal oxides can be used as catalysts for converting ammonium sulfate to metal sulfate, metal sulfates can also be employed for converting ammonium sulfate to ammonium pyrosulfate $((NH_4)_2S_2O_7)$. Sulfur dioxide and oxygen are products of ammonium pyrosulfate decomposition. Thus, a second class of modified S—$NH_3$ TCWSCs based on the $M_2S_2O_7$—$NH_3$ can be devised as follows:

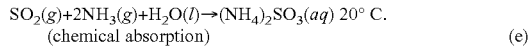

$SO_2(g) + 2NH_3(g) + H_2O(l) \rightarrow (NH_4)_2SO_3(aq)$ 20° C. (chemical absorption) (e)

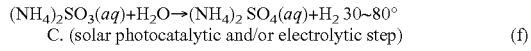

$(NH_4)_2SO_3(aq) + H_2O \rightarrow (NH_4)_2SO_4(aq) + H_2$ 30~80° C. (solar photocatalytic and/or electrolytic step) (f)

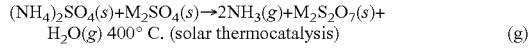

$(NH_4)_2SO_4(s) + M_2SO_4(s) \rightarrow 2NH_3(g) + M_2S_2O_7(s) + H_2O(g)$ 400° C. (solar thermocatalysis) (g)

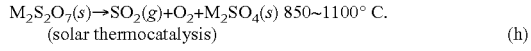

$M_2S_2O_7(s) \rightarrow SO_2(g) + O_2 + M_2SO_4(s)$ 850~1100° C. (solar thermocatalysis) (h)

Where, M is preferably K, Rb, and Cs.

This system includes a photocatalytic reactor for receiving an aqueous $(NH_3)_4SO_3$ solution to oxidize the aqueous $(NH_3)_4SO_3$ into aqueous $(NH_3)_2SO_4$ and reduce water to hydrogen, a mixer for mixing the resulting aqueous $(NH_3)_2SO_4$ with an aqueous metal sulfate $M_2SO_4$ to form an aqueous solution that is heated up in a low temperature reactor to produce a gaseous mixture of $NH_3$ and $H_2O$ and solid product, $M_2S_2O_7$, a high temperature reactor for heating solid $M_2S_2O_7$ to produce a gaseous mixture of $SO_2$ and $O_2$ and solid product, $M_2SO_4$ that is separated as a catalyst and reused in Reaction (g). The $SO_2$ and $O_2$ mixture is mixed with an $NH_3+H_2O$ stream in an absorber to form aqueous $(NH_4)_2SO_3$ solution while $O_2$ is separated. The aqueous $(NH_4)_2SO_3$ solution is then sent back to the photocatalytic reactor for the production of $H_2$ to close the water splitting cycle wherein gaseous $H_2$ and $O_2$ are the only products from the $M_2S_2O_7$—$NH_3$ cycles. This can also be realized by electrolytic process to oxidize aqueous $(NH_4)_2SO_3$ solution to $(NH_4)_2SO_4$ solution and reduce water to produce hydrogen.

Further objects and advantages of this invention will be apparent from the following detailed description of preferred embodiments which are illustrated schematically in the accompanying drawings.

DESCRIPTION OF THE PREFERRED EMBODIMENTS

Figure 1:
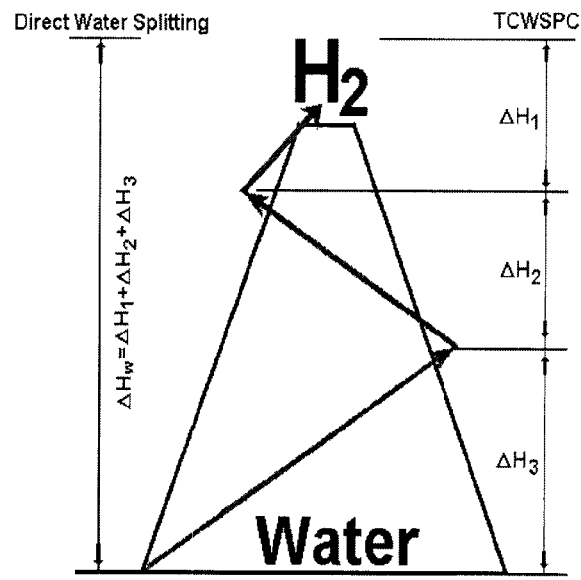
FIG. 1 illustrates the energy requirements for a three-step thermochemical water splitting cycle.
Figure 2:
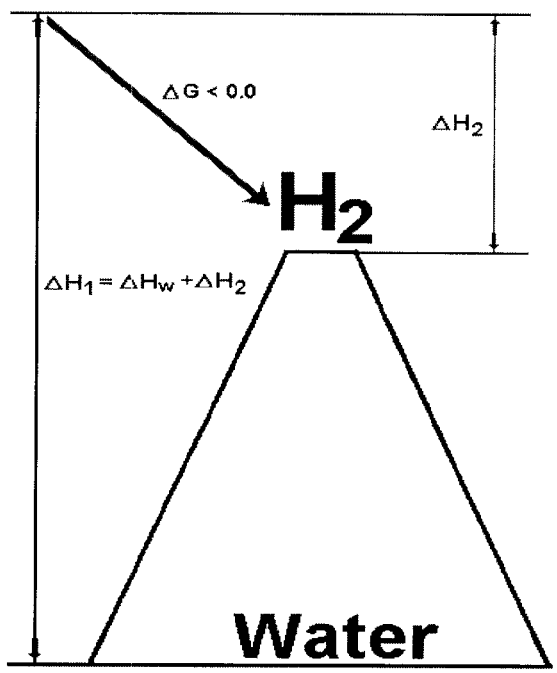
FIG. 2 shows the concept of pseudo thermochemical water splitting cycles having one step that consumes more energy than that needed for direct water splitting.
Figure 3:
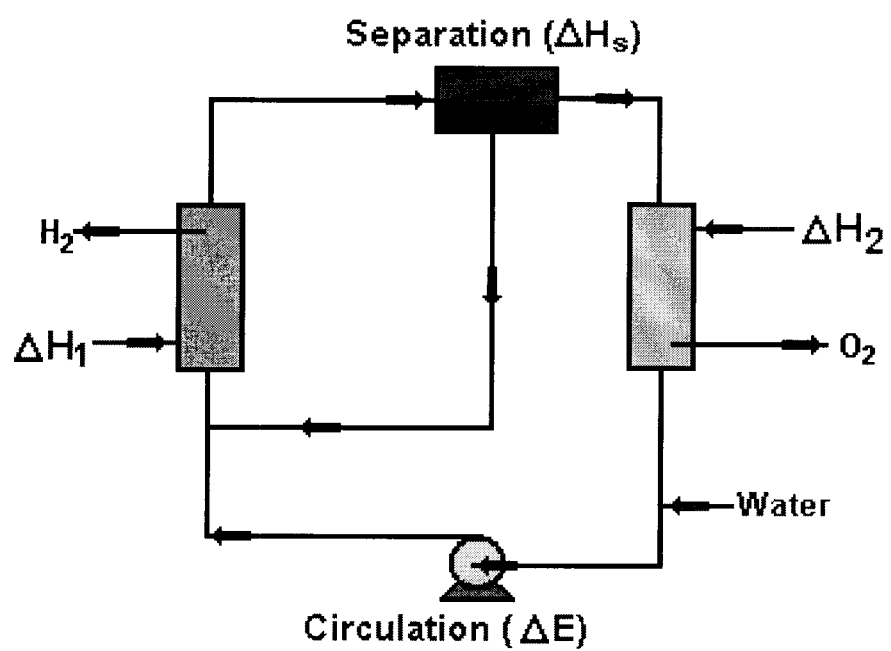
FIG. 3 is a simple flow diagram showing energies of a thermochemical water splitting cycle.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

As previously discussed, thermochemical water splitting cycle (TCWSC) efficiency is a function of efficiencies of both hydrogen and oxygen production steps according to equation (j). Solar energy consists of both photonic and thermal energies. The efficacy of any solar driven water splitting cycle depends upon the ability of the cycle to utilize as broad range of solar spectrum as possible—i.e. being able to exploit both the photonic (UV/visible) and thermal components of the solar radiation. Degradation (or thermallization) of the high energy portion of solar radiation to thermal heat, as is the case with purely thermochemical water splitting cycles, leads to lower cycle efficiencies. Solar spectrum is comprised of approximately one-third photonic energy with wavelengths less than 585 nm, and two-thirds mostly thermal heat with wavelengths greater than 585 nm. Thermodynamically, the total energy ($\Delta H$) required to produce $H_2$ by water splitting is $\Delta H=\Delta G+T\Delta S$. At a given temperature T, a process will be more efficient if it can utilize the 33% photonic energy of solar radiation as Gibbs free energy, $\Delta G$, and the remaining 67% solar thermal component as $T\Delta S$.

Present technologies for the solar production of $H_2$ via direct water splitting use either the photonic energy or the thermal energy portion of solar spectrum, but not both. These processes are not efficient for the following reasons. Direct thermal decomposition of water degrades solar photonic energy to lower grade thermal heat, resulting in an exergy loss. In addition, direct thermal processing requires temperatures in excess of 2500° C. and recombination of $H_2$ and $O_2$ is problematic. Photoelectrochemical (PEC) water splitting has merits over the photovoltaic (PV) plus water electrolysis as it combines photochemical and electrochemical steps into one single process for direct hydrogen production. However, in the PEC process, only about one-third of entire solar spectrum is used and the thermal component of sunlight is wasted. Consequently, the PEC energy conversion efficiencies are still at a low level.

The method and system of the present invention provides a hybrid photo/thermo-chemical water splitting cycle employs the quantum portion of the solar spectrum for the production of $H_2$ and the thermal portion (i.e., IR) portion of solar radiation for $O_2$ evolution. Utilization of the full solar spectrum allows the cycle to reach potentially a higher overall efficiency than is possible with the purely thermochemical water splitting cycles of the past. The previous inventions sulfur-ammonia (S—$NH_3$) hybrid photo/thermochemical cycle is represented by the following four reactions:

$$SO_2(g) + 2NH_3(g) + H_2O(l) \rightarrow (NH_4)_2SO_3(aq)\ 25°\text{C. (chemical absorption)} \quad (70)$$

$$(NH_4)_2SO_3(aq) + H_2O \rightarrow (NH_4)_2SO_4(aq) + H_2(g)\ 30\sim80°\text{C. (photocatalytic and/or electrolytic step)} \quad (71)$$

$$(NH_4)_2SO_4 \rightarrow 2NH_3(g) + H_2SO_4(g)\ 252°\text{C. (thermocatalytic step)} \quad (72)$$

$$H_2SO_4(l)\ SO_2(g) + H_2O(g) + \tfrac{1}{2}O_2(g)\ 852°\text{C. (thermocatalytic step)} \quad (73)$$

Solar thermal energy is used to drive Reactions (72) and (73) for the production of $O_2$ via decomposition of ammonium sulfate $(NH_4)_2SO_4$ and sulfuric acid $H_2SO_4$. Reaction (71) is a photocatalytic process in which $SO_3^{2-}$ ions are oxidized to $SO_4^{2-}$ in the presence of UV-visible light, a photocatalyst and water, generating hydrogen. Solar thermal, i.e. near infrared (NIR) and infrared (IR), and UV-visible portions of solar radiation are resolved using a spectral splitting mirror. The thermal part of the sunlight is then concentrated into a high temperature thermocatalytic reactor/receiver and used for oxygen production, while the photonic (UV and visible light) portion passes through a coating layer driving the photocatalytic hydrogen generation reaction.

Reaction (71) requires approximately 0.52 V potential (vs. NHE) in a 1 M aqueous (NH4)2SO3 solution with a pH of 7.8. This potential is about ⅓ of that needed for water splitting (approximately 1.5V). Furthermore, as noted before, Reaction (73) requires 80.9% of the total solar irradiance that is comprised of mostly thermal energy with wavelengths above 520 nm. The remaining 19.1% of the solar irradiance which is comprised of photonic energy at wavelengths less than about 520 nm are available to carry out hydrogen production step of the cycle.

It was previously shown that this partitioning of solar irradiance was necessary for achieving the optimum overall cycle efficiency—i.e. the oxygen production step consume 80.9% of the solar thermal energy at wavelengths of approximately 520 nm or above and the hydrogen generation step utilizing the remaining 19.1% of solar light having wavelengths shorter than 520 nm. The hydrogen generation step of would preferably occur within a photolytic or photocatalytic reactor. A suitable photocatalyst for carrying out the hydrogen generation step was identified as cadmium sulfide with the optical absorption edge (λedge) of 512 nm for bulk CdS.

Reaction (70) in the S—$NH_3$ cycle is a chemical adsorption process. An acid gas ($SO_2$) and an alkaline gas ($NH_3$) react and readily form the aqueous $(NH_4)_2SO_3$ solution. Reaction (91) is a photocatalytic hydrogen production step in which photonic energy is converted to chemical energy of hydrogen. Reaction (91) can occur via either a visible light photocatalytic process or a UV light photolytic route. Experimental data obtained to date show it is possible to carry out Reaction (91) with an energy conversion efficiency of about 12% using CdS as the photocatalyst. FIG. 7 depicts the rate of $H_2$ production from an aqueous $(NH_4)_2SO_3$ solution using a 1000 W solar simulator fitted with an AM 1.5 global filter. Data of FIG. 7 show an increased rate of hydrogen production if the platinum doped CdS used was polymer-stabilized.

It should be possible to combine Reactions (72) and (73) into one single step. In fact, Reaction (72) is an intermediate step in which $NH_3$ as is recovered used for converting $SO_2$ to $(NH_4)_2SO_3$ needed for the next reaction step.

A preliminary thermogravimetric/differential thermal analyses (TG/DTA) instrument coupled to a mass spectrometer has been used to study decomposition of $(NH_4)SO_4$. Results obtained show that the decomposition of $(NH_4)SO_4$ occurs in two separate stages at 250° C. and 340° C. depending upon the heating rate and material of the sample holder. There were no sulfur or nitrogen gases evolving during the thermolysis process. This suggests that the S—$NH_3$ cycle as shown below:

$$2(NH_4)_2SO_4(s) = (NH_4)_2S_2O_7(s) + 2NH_3(g) + H_2O(g) \quad (74)$$

$$(NH_4)_2S_2O_7(s) = 2NH_3(g) + H_2S_2O_7(g) \quad (75)$$

$$H_2S_2O_7(g) = H_2SO_4(g) + SO_3(g) \quad (76)$$

can be indeed a closed TCWSC with net reaction being that of water splitting:

$$2(NH_4)_2SO_4(s) = H_2SO_4(g) + SO_3(g) + 4NH_3(g) + H_2O(g) \quad (77)$$

Since most of the energy input into the cycle is used to accomplish Reaction (76), the overall cycle efficiency is strongly influenced by the efficiency of the $H_2SO_4$ decomposition step. Thermocatalytic decomposition of $H_2SO_4$ has been investigated extensively and very high process efficiencies have been reported. Splitting the solar irradiance so that it can be input into two separate processes eases the requirement for high process efficiency for the photochemical reaction step of the S—$NH_3$ cycle.

As noted in the previous section, for $C_R = 1500$, at 1125 K, a maximum theoretical efficiency (or the 1$^{st}$ law efficiency, $\eta_1$) of about 73.33% is possible for the $H_2SO_4$ decomposition step. In other words, the portion of solar energy that could be captured to conduct acid decomposition and generate oxygen is 73.33%. We also note that at temperature higher than 1000° C., $H_2SO_4$ decomposition is no longer kinetically limiting step, rather, thermodynamics controls the extent of the conversion.

The co-inventors' previous S—$NH_3$ cycle utilizes decomposition of sulfuric acid as the endothermic step for the absorption of solar thermal heat for the production of oxygen However, decomposition of higher concentrated sulfur acid presents daunting materials of construction issues. Additionally, separation of gaseous $NH_3$ from $H_2SO_4$ (Reaction 72) gas involves a separation difficulty. Like the metal sulfate based TCWSCs, it is possible to modify the S—$NH_3$ cycle eliminating the step of the decomposition of $H_2SO_4$. There are two ways to accomplish this. The first approach is to introduce a metal oxide (MO) as a mediate to promote the decomposition of ammonium sulfate $((NH_4)_2SO_4)$ produced in the hydrogen production step of the S—$NH_3$ cycle (Reaction (70). This process replaces the decomposition of $H_2SO_4$ with metal sulfate ($MSO_4$) decomposition. The second approach is to convert ammonium sulfate to metal pyrosulfate (e.g. $K_2S_2O_7$). When a two valance metal oxide MO (e.g. ZnO) is introduced into the S—$NH_3$ TCWSC, a new family of $MSO_4$—$NH_3$ based cycles is devised as follows:

$$SO_2(g)+2NH_3(g)+H_2O(l)\rightarrow(NH_4)_2SO_3(aq) \text{ (chemical absorption, approximately 20° C.)} \quad (78)$$

$$(NH_4)_2SO_3(aq)+H_2O(l)\rightarrow(NH_4)_2SO_4(aq)+H_2(g) \text{ (solar photocatalytic and/or electrolytic, approximately 30~80° C.)} \quad (79)$$

$$(NH_4)_2SO_4(s)+MO(s)\rightarrow2NH_3(g)+MSO_4(s)+H_2O(g) \text{ (solar thermocatalytic, approximately 400° C.)} \quad (80)$$

$$MSO_4(s)\rightarrow SO_2(g)+MO(s)+O_2 \text{ (solar thermocatalytic, approximately 850~1100° C.)} \quad (81)$$

Where, M=Zn, Mg, Ca, Ba, Fe, Co, Ni, Mn, Cu and Pb. Oxides $Fe_2O_3$ and $Cu_2O$ can also be included for by slightly modifying Reactions (80) and (81).

Decomposition of metal sulfates, especially $ZnSO_4$, has been reported by a number of researchers. For example, the co-inventors have conducted a series of $ZnSO_4$ decomposition experiments at very rapid heating rates in a concentrating solar simulator. Their findings revealed that $ZnSO_4$ can be completely decomposed into $SO_2$, $O_2$ and ZnO. Depending on the magnitude of sample heating rates, a small amount of $SO_3$ can also be formed. At rapid heating rates (approximately 1~2° C./s) prevailing within concentrating solar furnaces, formation of $SO_3$ can be minimized, eliminating a needed separation of $SO_2$ from $SO_3$. Unlike the sulfur-ammonia based TCWSCs that employ reaction between sulfuric acid and a metal oxide (e.g. Reaction (67)), the new $MSO_4$—$NH_3$ cycles rely on the Reaction (7680) that was first reported in 1955 by Dugger and coworkers who developed a process for the recovery of ammonia from ammonium sulfate in a two-stage reaction as follows:

$$(NH_4)_2SO_4+ZnO\rightarrow2NH_3+ZnSO_4+H_2O \text{ 250~350° C.} \quad (82)$$

$$ZnSO_4(s)\rightarrow SO_2(g)+ZnO(s)+O_2 \text{ 800~1200° C.} \quad (83)$$

Experimental data show that all the nitrogen component is recovered as $NH_3$, uncontaminated by sulfur oxides, in the low temperature stage. The major sulfur species formed at high temperatures was sulfur dioxide. In another study, Wentworth reported an ammonia yield of 99.3% by the following reactions involving ammonium hydrogen sulfate and zinc oxide:

$$2NH_4HSO_4(l)+3ZnO(s)\rightarrow2NH_3(g)+ZnO.2ZnSO_4(s)+2H_2O(g) \text{ 365~418° C.} \quad (84)$$

$$ZnO.2ZnSO_4(s)\rightarrow2SO_2(g)+3ZnO(s)+O_2 \text{ 800~1000° C.} \quad (85)$$

It is therefore clear that Reaction (80) can be the basis of the new $MSO_4$—$NH_3$ TCWSCs. Experimental results have shown that, in $ZnSO_4$—$NH_3$ cycle, $NH_3(g)$ and $H_2O(g)$ are the only products of the low temperature reaction (($NH_4)_2SO_4(s)$+ZnO(s)=2$NH_3(g)$+$H_2O(g)$), indicating that there is no sulfur value products are wasted in this reaction. Besides, no $NH_3$ oxidation products, such as $N_2O$ and NO are found, indicating no $NH_3$ loss in the reaction.

Just as metal oxides can be used as catalysts for converting ammonium sulfate to metal sulfate, metal sulfates can also be employed for converting ammonium sulfate to ammonium pyrosulfate (($NH_4)_2S_2O_7$)). The products of decomposition of ammonium pyrosulfate are sulfur dioxide and oxygen. Thus, a second class of modified S—$NH_3$ TCWSCs based on the $M_2S_2O_7$—$NH_3$ can be devised as follows:

$$SO_2(g)+2NH_3(g)+H_2O(l)\rightarrow(NH_4)_2SO_3(aq) \text{ (chemical absorption, 20° C.)} \quad (86)$$

$$(NH_4)_2SO_3(aq)+H_2O(l)\rightarrow(NH_4)_2SO_4(aq)+H_2(g) \text{ (solar photocatalytic and/or electrolytic step, 30~80° C.)} \quad (87)$$

$$(NH_4)_2SO_4(s)+M_2SO_4(s)\rightarrow2NH_3(g)+M_2S_2O_7(s)+H_2O(g) \text{ (solar thermocatalytic, approximately 400° C.)} \quad (88)$$

$$M_2S_2O_7(s)\rightarrow SO_2(g)+O_2+M_2SO_4(s) \text{ (solar thermocatalytic, approximately 1100° C.)} \quad (89)$$

Where, M=K, Rb, Cs. Reactions (88) and (89) were previously described by Wentworth.

Reagent grade $(NH_4)SO_4$ and zinc oxide were used without further purification. Deionized water was generated in a two-step purification system with conductivity of 18.3 MΩ-cm. Tap water was deionized by first passing the liquid through a Water PRO/RO filtration unit and then through a compact ultra pure water deionization system decomposition experiments were carried out using a Perkin Elmer thermogravimetric/differential thermal analyses (TG/DTA) coupled to a mass spectrometer (Pfeiffer TheroStar™) with ultra pure grade helium gas (Linde Gas) as a carrier gas. The helium flow rate was set at 150 mL/min, monitored with a rotameter. In these experiments, aluminum sample holder was employed to investigate the decomposition of ammonium sulfate catalyzed by ZnO. The dimensions of the sample holders were: 5.210 mm OD, 4.965 mm high and wall thickness of 0.535 mm. The mixtures of ammonium sulfate and zinc oxide were prepared by adding ZnO into aqueous ammonium sulfate solutions and stirring up for two hours. The slurry was heated up to 50° C. under a vacuum condition. The dried samples were subjected to TG/DTA/MS measurements at different heating rates with heating temperature from 50° C. to 600° C.

Figure 7A:
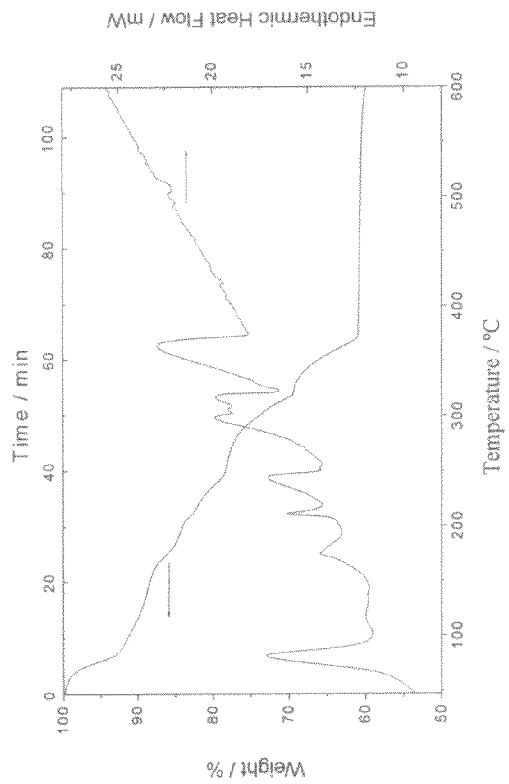
FIGS. 7a and 7b show TG/DTA/MS spectral analyses for $ZnO+(NH_4)_2SO_4$ mixture, molar ratio $x=ZnO:(NH_4)_2SO_4 = 1:1$, heating rate=5° C./min.
Figure 7B:
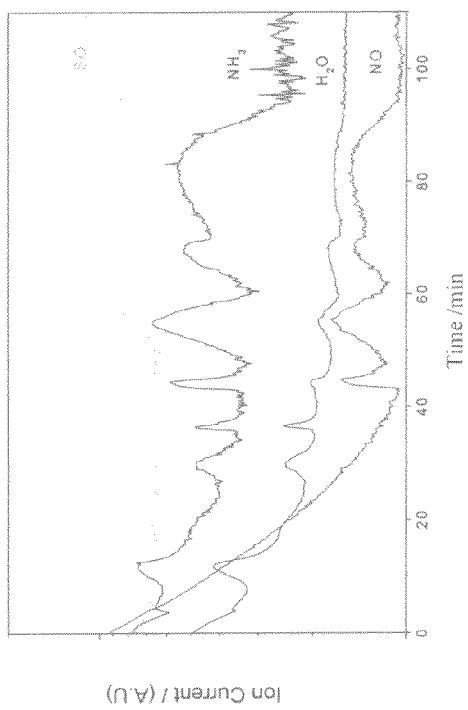
Figure 8A:
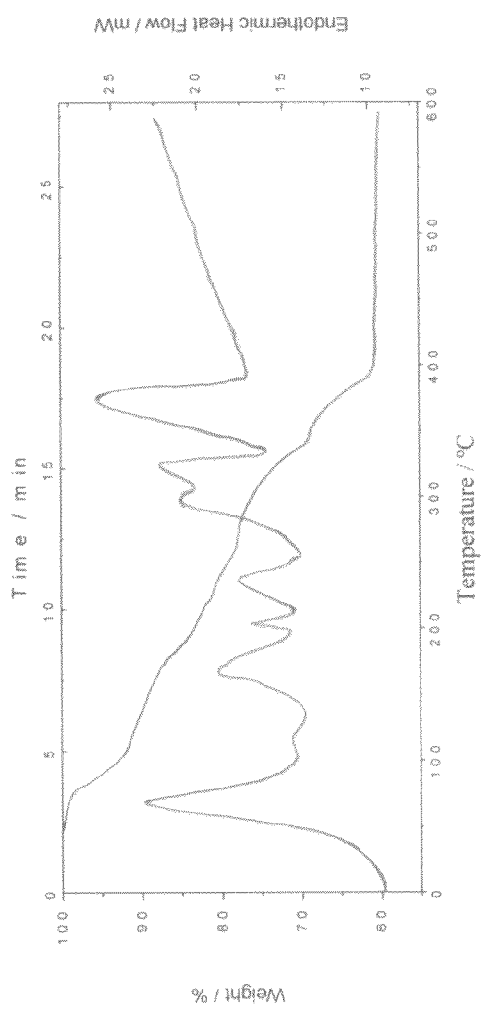
FIGS. 8a and 8b show TG/DTA/MS spectral analyses for $ZnO+(NH_4)_2SO_4$ mixture, molar ratio $x=ZnO:(NH_4)_2SO_4=1:1$, heating rate=20° C./min.
Figure 8B:
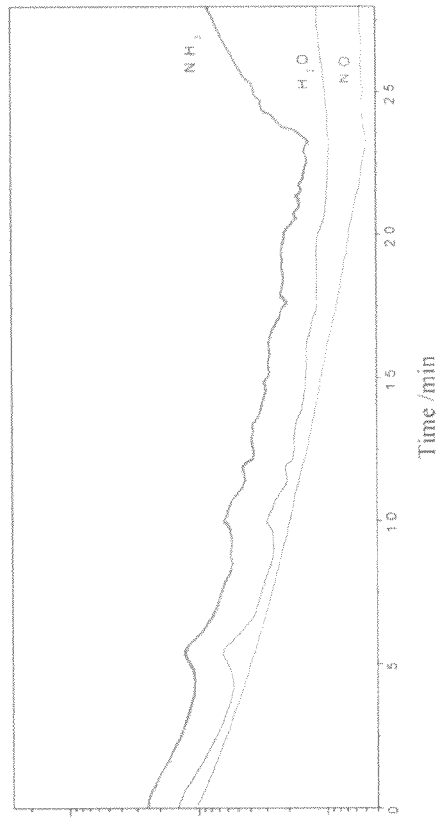
Figure 9A:
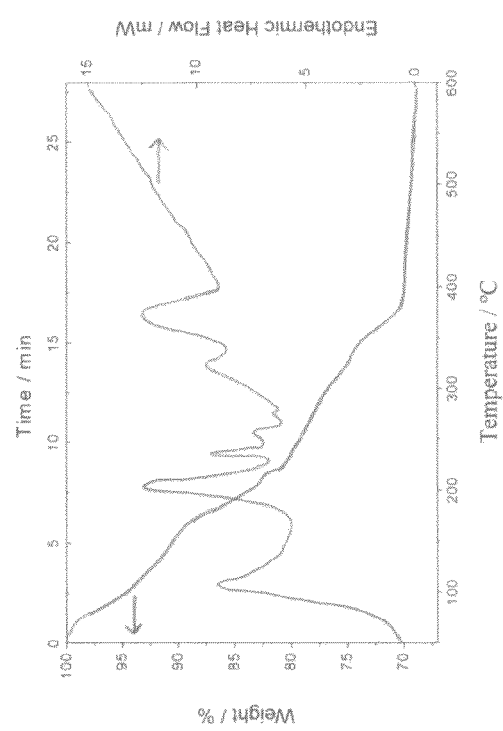
FIGS. 9a and 9b show TG/DTA/MS spectral analyses for $ZnO+(NH_4)_2SO_4$ mixture, molar ratio $x=ZnO:(NH_4)_2SO_4=1.5:1$, heating rate=20° C./min.
Figure 9B:
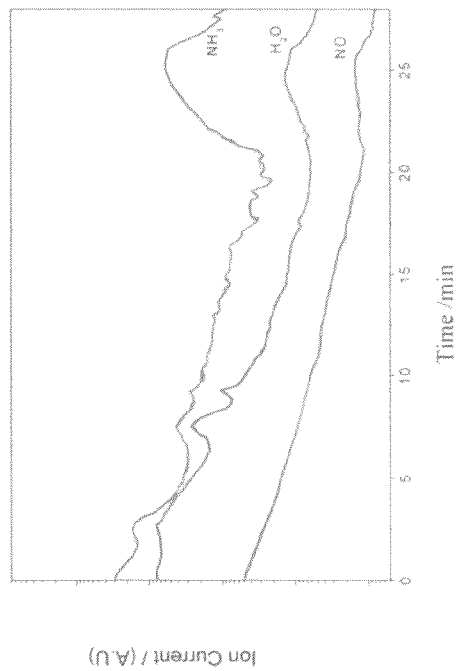

The results of MS spectral measurements show that no $O_2$, $N_2$, $H_2$, $HNO_2$, $NO_2$, $SO_3$, $H_2SO_4$ were detected during this temperature range. The major products of the MS measurements are $NH_3$, $H_2O$, and small amount of $SO_2$ and NO. FIGS. 7a and 7b show the TG/DTA/MS results for ZnO+$(NH_4)_4SO_4$ mixture with molar ratio of ZnO:$(NH_4)_4SO_4$=1:1 at heating rate of 5° C./min. The results indicate that de-ammoniation and dehydration ammonia from the ZnO+$(NH_4)_2SO_4$ mixture are a complicated process at separated several stages. TG/DTA curves show that $NH_3$ releasing can be separated into five to six steps started from temperature as low as 50° C. and ended 500° C. Heating rate has a significant influence on the ammonia releasing temperature. FIGS. 8a and 8b shows that when heating rate increases to 20° C., $NH_3$ releasing postpones to a higher temperature and NO and $SO_2$ peaks decrease. Isothermal heating processes can also reduce the leasing of $SO_2$ and NO. As indicated in FIGS. 9a and 9b, de-ammoniation from a 1.5ZnO+$(NH_4)_2SO_4$ mixture can be significantly reduced after the isothermal process. Et is also observed that $SO_2$ peaks move to a higher temperature with smaller peak heights.

In addition to the main reaction, the de-ammination process from the mixture of ZnO+$(NH_4)_2SO_4$ is companied with some intermediate reactions as:

$$(NH_4)_2SO_4(s)=NH_4HSO_4(s)+NH_3(g) \quad (90)$$

$$ZnSO_4(s)+xNH_3(g)=ZnSO_4(s).xNH_3 \text{ (x~1 to 6)} \quad (91)$$

$$ZnO(s)+2ZnSO_4(s)=ZnO.2ZnSO_4(s) \text{ with xs ZnO} \quad (92)$$

$$NH_4HSO_4(s)+ZnO(s)=ZnSO_4(s)+NH_3(g)+H_2O(g) \quad (93)$$

$$ZnSO_4.xNH_3(s)=ZnSO_4(s)+xNH_3(g) \quad (94)$$

Figure 10A:
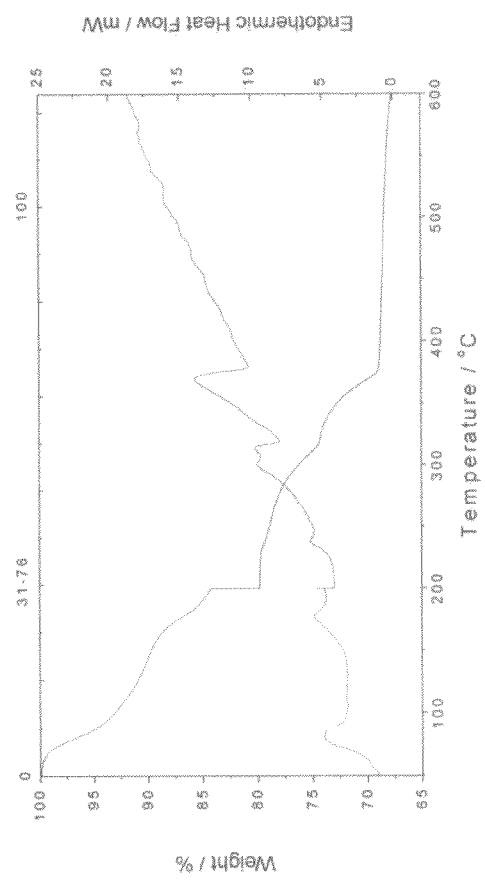
FIGS. 10a and 10b show TG/DTA/MS spectral analyses for $ZnO+(NH_4)_2SO_4$ mixture, molar ratio $x=ZnO:(NH_4)_2SO_4=1.5:1$. Heat sample from room temperature to 200° C. at heating rate=50° C./min and hold temperature at 200° C. for 45 minutes and then heat sample to 600° C. at the rate of 10° C.
Figure 10B:
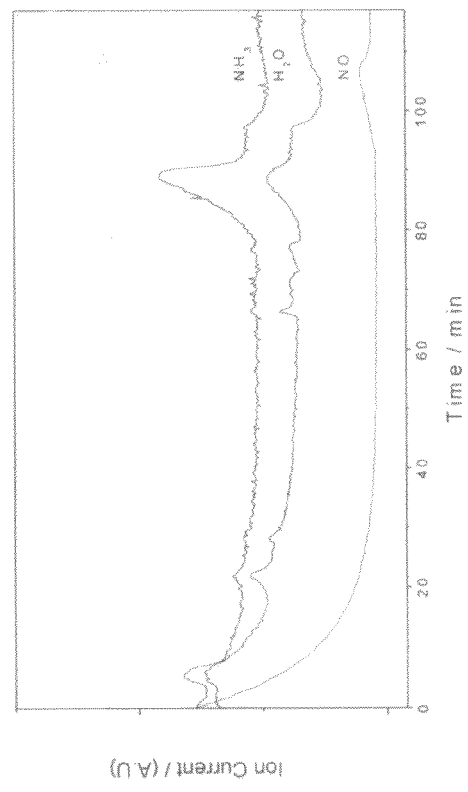

It is noted that increasing the ratio of ZnO to $(NH_4)_2SO_4$, more ammonia is released at a lower temperature (FIGS. 8 and 9). As indicated in MS spectra, less $SO_2$ is released at lower temperature range (300 to 400° C.). Changing the heating method. for example, holding temperature at 200° C. for 45 minutes. Both $SO_2$ and NO peaks are significantly reduced as shown in FIGS. 10*a* and 10*b*.

One main feature of the $MSO_4$—$NH_3$ and $M_2S_2O_7$—$NH_3$ cycles of the present invention is that separation unit operations are not necessary. It is obvious that for $H_2$ production step, gaseous $H_2$ is generated from aqueous solution and no separation is required. In a low temperature reaction, gaseous products, $NH_3$ gas and water vapor can be separated automatically from solid product $ZnSO_4$, which starts decomposition at temperature above approximately 600° C. A gaseous mixture containing $SO_2$ and $O_2$ is generated from solid $ZnSO_4$ at temperatures higher than approximately 800° C. and they can be separated easily from solid product ZnO. The separation of $SO_2$ from $O_2$ is accomplished by a chemical absorption step where $SO_2$ reacts with $NH_3$ and $H_2O$ to form aqueous $(NH_4)_2SO_3$ solution and therefore $O_2$ is therefore separated.

Figure 4:
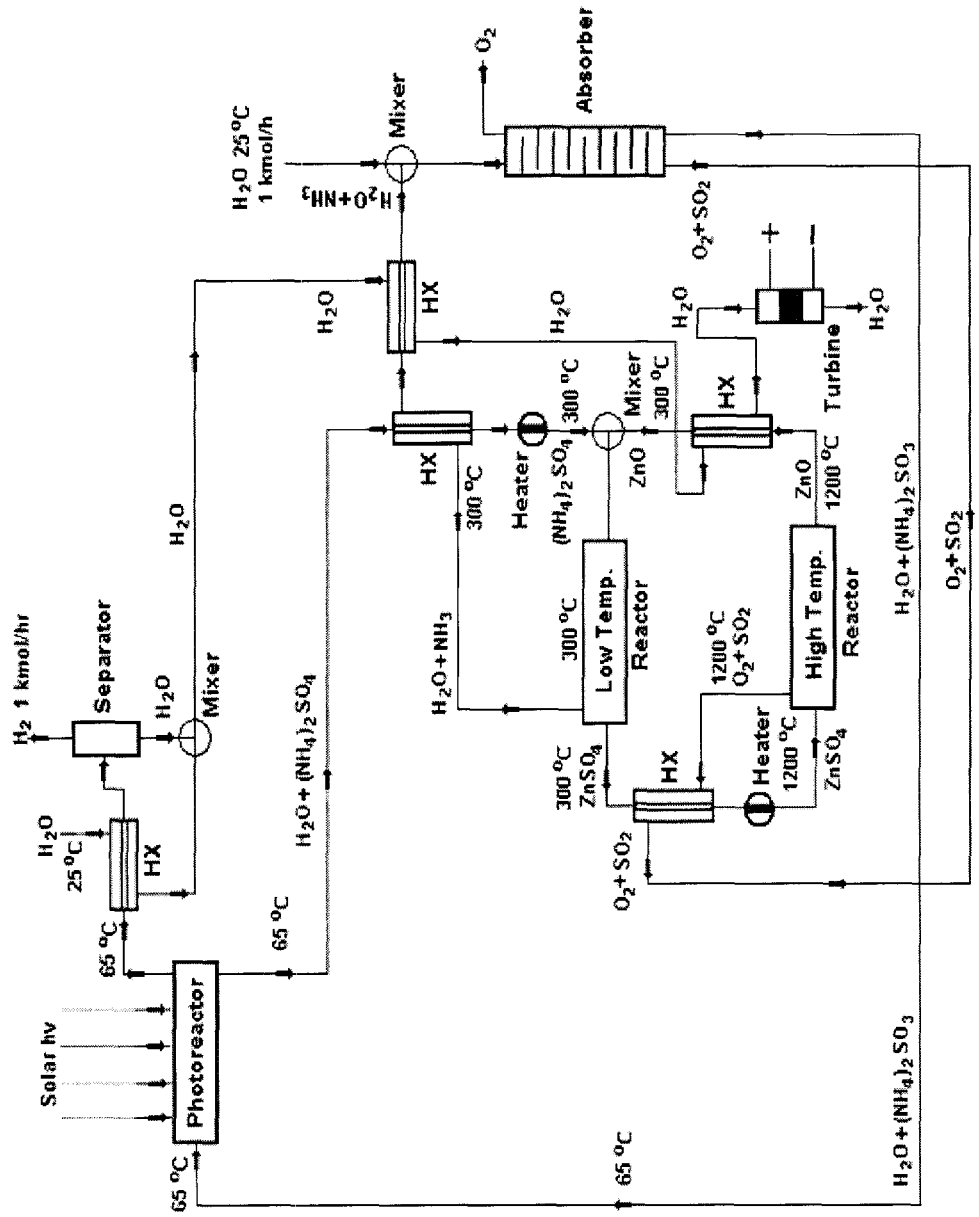
FIG. 4 is a process flow diagram of the hybrid photo/thermal-chemical water splitting cycle according to the present invention.
Figure 5:
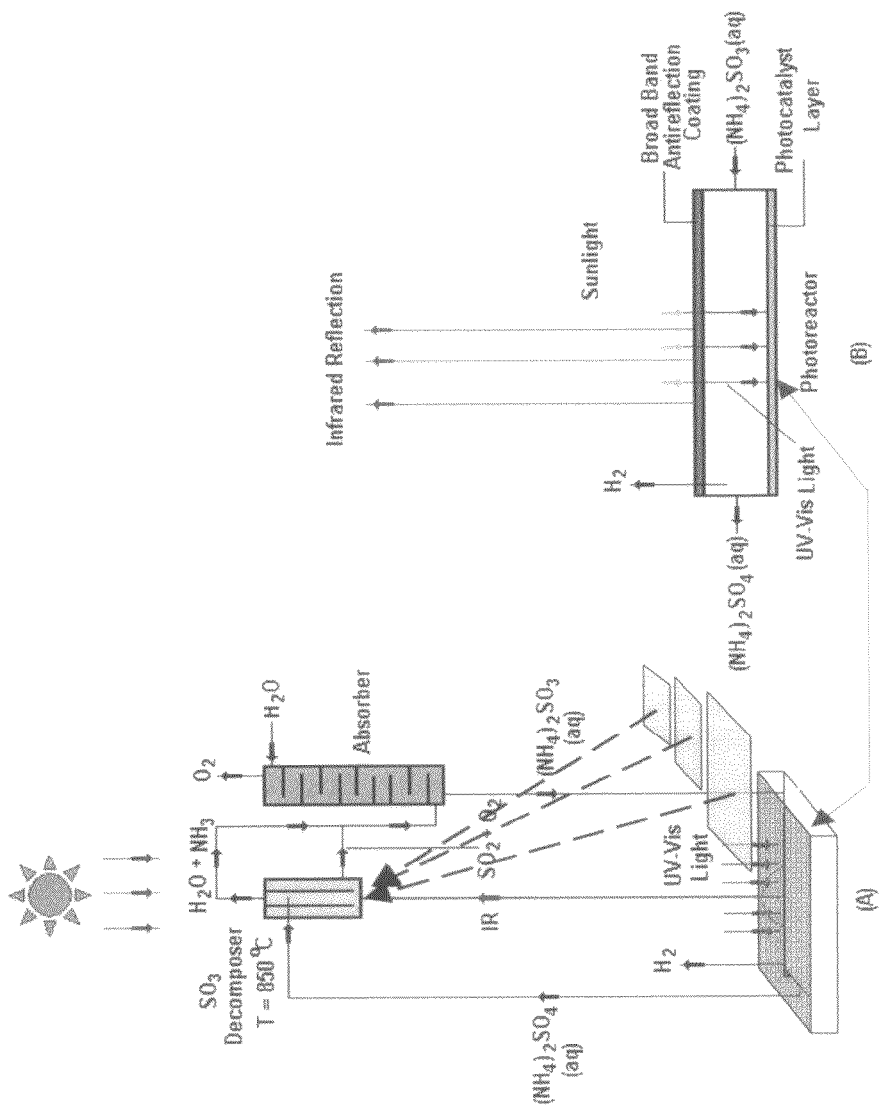
FIG. 5 shows a schematic diagram of the solar powered S—$NH_3$ photothermochemical water splitting cycle.
Figure 6:
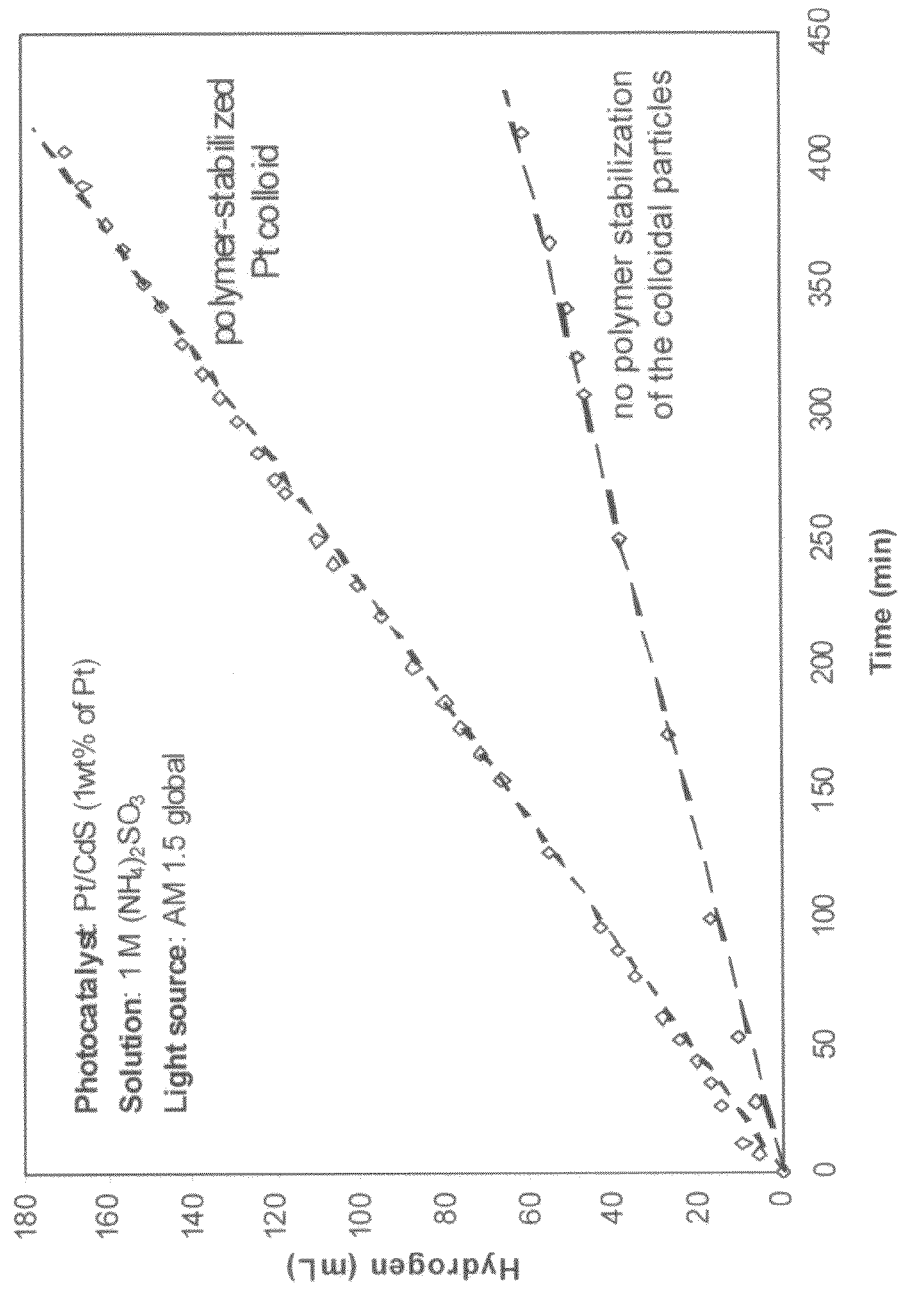
FIG. 6 is a graph showing hydrogen evolution rates from an aqueous $(NH_4)_2SO_3$ solution (beam area: 33 cm², light intensity: ~1.5 kW/m², solution pH=7.5, solution volume=200 mL, and 0.25 g Pt/CdS photocatalyst).

As discussed above, the $MSO_4$—$NH_3$ and $M_2S_2O_7$—$NH_3$ TCWSPCs of the present invention do not require separation unit operations that simplifies the process design. FIG. 4 is a flow diagram of the $ZnSO_4$—$NH_3$ cycle according to the present invention. Aqueous $(NH_3)_4SO_3$ solution is fed into a photoctalytic reactor where it is oxidized into $(NH_3)_2SO_4$ meanwhile water is reduced to hydrogen. After mixing with ZnO, the slury of ZnO and the aqueous $(NH_4)_2SO_4$ is heated to reaction temperature of approximately 300° C. in the Low Temperature Reactor where a gaseous mixture of $NH_3$ and $H_2O$ are produced and separated from solid product $ZnSO_4$. Solid $ZnSO_4$, is then heated to approximately 850 to 1100° C. at High Temperature Reaction for the production of a gaseous mixture of $SO_2$ and $O_2$ that is separated from solid product ZnO. The gaseous mixture of $SO_2$ and $O_2$ is mixed with $NH_3+H_2O$ stream in an Absorber where $SO_2$ and $NH_3$ are absorbed to form aqueous $(NH_4)_2SO_3$ solution at the same time $O_2$ is separated the aqueous solution. The aqueous $(NH_4)_2SO_3$ solution is then recycled back to the Photoreactor to close the entire water splitting cycle with $H_2$ and $O_2$ as the only products. FIG. 4 also shows a cold water stream introduced into the system to recover heat from any possible high temperature sources for the generation of hot stream that can be used to drive a microturbine to produce electricity.

As shown in FIG. 4, no separators are required for the separation of either a gas from a gas mixture or a liquid from an aqueous solution. Therefore the TCWSPCs of the present invention can be a high efficiency process with low capital cost. A priliemary AspenPlus™ chemical engineering simulation has been carried out and shown that higher than 45% of efficiency (HHV) is achievable.

In summary, any thermochemical water splitting cycle consists of at least two main steps: hydrogen and oxygen production steps. A two-step water splitting cycle can not be efficient if energy requirements for the two steps is significantly greater than that of direct thermal water splitting. Due to the intrinsic difficulties of sulfuric acid decomposition, the present invention provides two new classes of solar driven TCWSCs by modifying the original S—$NH_3$ cycle. They include: (I) 12 metal sulfate-ammonia ($MSO_4$—$NH_3$) based TCWSPCs and (II) 3 metal pyrosulfate-ammonia ($M_2S_2O_7$—$NH_3$) based TCWSCs. Based on the experimental data presented, it has been shown that these TCWSCs can attain a high $1^{st}$ law efficiency by splitting the solar spectrum into two sections and using the shorter wavelength photonic portion for photocatalytic $H_2$ production and the longer wavelength and IR portions of the sunlight for the thermocatalytic $O_2$ production from $MSO_4$ or $M_2S_2O_7$ decomposition. Preliminary experimental results of the ammonia released from the $ZnO+(NH_4)SO_4$ mixtures show the feasibility of these new cycles.

A first preferred embodiment of the invention provides a methods for a $ZnSO_4$—$NH_3$ cycle for producing $H_2$ and $O_2$ from a closed water splitting system that includes feeding an aqueous $(NH_3)_4SO_3$ solution into a photoctalytic reactor where the aqueous $(NH_3)_4SO_3$ is oxidized into aqueous $(NH_3)_2SO_4$ and reduce water to produce hydrogen. The resulting aqueous $(NH_3)_2SO_4$ is mixed with ZnO powder to a slurry of ZnO and $(NH_4)_2SO_4$. The slurry is heated in the low temperature reactor to produce a gaseous mixture of $NH_3$ and $H_2O$ and solid product $ZnSO_4$ that is decomposed at a high temperature reactor to produce a gaseous mixture of $SO_2$ and $O_2$ and solid ZnO. The gaseous mixture of $SO_2$ and $O_2$ is mixed with the $NH_3$ and $H_2O$ stream in an absorber to generate aqueous $(NH_4)_2SO_3$ solution and, at the same time, $O_2$ is separated. The aqueous $(NH_4)_2SO_3$ solution is then recycled back to the photoreactor to close the water splitting cycle wherein gaseous $H_2$ and $O_2$ are the only products from the closed $ZnSO_4$—$NH_3$ cycle.

In an embodiment, the method also includes introducing a cold water stream into the closed system to recover heat from the high temperature reactor to generate a hot stream; and using the hot steam to drive a microturbine to produce electricity.

A second embodiment provides a closed system for producing $H_2$ and $O_2$. The system includes a photocatalytic reactor for converting an aqueous $(NH_3)_4SO_3$ solution to aqueous $(NH_3)_2SO_4$ and reduce water to hydrogen, a mixer for mixing the resulting aqueous $(NH_3)_2SO_4$ with $K_2SO_4$ to form a solution containing aqueous $K_2SO_4$ and $(NH_4)_2SO_4$. The solution is heated in a low temperature reactor to produce a gaseous mixture of $NH_3$ and $H_2O$ and a solid product of $K_2S_2O_7$. $K_{2}S_2O_7$ is decomposed in a high temperature reactor to produce a gaseous mixture of $SO_2$ and $O_2$ and solid $K_2SO_4$. The gaseous mixture of $SO_2$ and $O_2$ is combined with $NH_3$ and $H_2O$ stream in an absorber where $SO_2$ reacts with $NH_3$ to form aqueous $(NH_4)_2SO_3$ solution and separate $O_2$ at the same time. Aqueous $(NH_4)_2SO_3$ solution is then cycled back to the photocatalytic reactor to close the $K_2S_2O_7$—$NH_3$ based water splitting cycle wherein gaseous $H_2$ and $O_2$ are the only products from the closed $K_2S_2O_7$—$NH_3$ cycle. This embodiment is further described in the summary of the invention.

The photocatalytic process can also be realized by a electrolytic process to oxidize aqueous $(NH_4)_2SO_3$ solution to $(NH_4)_2SO_4$ solution and reduce water to produce hydrogen.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A hybrid continuous and closed photo and thermochemical water splitting cycle method consisting essentially of the steps of:

receiving a solar radiation;

using only the quantum portion of a solar spectrum in a photoreactor for the simultaneous production of hydrogen and ammonium sulfate via photochemical oxidation of aqueous ammonium sulfite solution;

reacting the ammonium sulfate with one of a metal oxide selected from a group consisting of ZnO, MgO, CaO, BaO, Fe$_2$O$_3$, CO$_2$O$_3$, NiO, MnO$_4$, Cu$_2$O and Pb$_2$O$_3$ to produce ammonium, metal sulfate and water, and a metal sulfate selected from a group consisting of K$_2$SO$_4$, Rb$_2$SO$_4$, and CsSO$_4$ to produce ammonium, metal pyrosulfate and water, wherein the ratio of metal oxide or metal sulfate to ammonium sulfate is maintained at 1.5 to 1;

using the solar thermal radiation for the simultaneous production of oxygen, metal oxide and sulfur dioxide based on one of the decomposition of metal sulfate and decomposition of metal pyrosulfate, wherein the heating rate is maintained at 5° C./min to 50° C./min;

adding water to react with the ammonia and sulfur dioxide for the production of ammonium sulfite to close the hybrid photo/thermal water splitting cycles;

supplying the regenerated ammonium sulfite to the photoreactor;

repeating the steps starting with the hydrogen production step;

wherein the method implements a closed water splitting cycle, and wherein only the water is consumed by the closed water splitting cycle.

2. The method of claim 1, wherein the solar spectrum separating step includes the step of:

using a spectral splitting mirror for separating the solar radiation into near infrared and infrared from the ultraviolet and visible portions.

3. The method of claim 2, wherein the production of hydrogen step comprises the steps of:

using a corresponding one of a photocatalytic step or an electrocatalytic step.

4. The method of claim 3, further comprising the step of:

providing a coating layer on the spectral splitting mirror for passing an UV and visible light portion through the spectral splitting mirror to drive the photocatalytic hydrogen generation reaction.

5. The method of claim 3, wherein the hydrogen production step comprises the steps of:

a chemical absorption step according to SO$_2$ (g)+2NH$_3$ (g)+H$_2$O(l)→(NH$_4$)$_2$SO$_3$(aq) at approximately 25° C.; and a photocatalytic step according to (NH$_4$)$_2$SO$_3$(aq)+H$_2$O→ (NH$_4$)$_2$SO$_4$(aq)+H$_2$(g) at approximately 30 to approximately 80° C.

6. The method of claim 3, wherein the photocatalytic or electrocatalytic step includes:

generating hydrogen by oxidizing SO$_3^{2-}$ ions to SO$_4^{2-}$ in one of a photocatalytic process with the presence of ultraviolet-visible light or in an electrolytic process under an electrical potential.

7. The method of claim 1, wherein the hydrogen production step comprises the steps of:

an electrochemical or photochemical process to oxidize aqueous (NH$_4$)$_2$SO$_3$ solution to (NH$_4$)$_2$SO$_4$ solution and reduce water to produce hydrogen.

8. The method of claim 1, wherein the thermal chemical reaction step includes:

introducing a metal oxide as a mediate to promote the decomposition of ammonium sulfate produced in the hydrogen production step.

9. The method of claim 1, wherein the production of oxygen step includes:

introducing one of the metal oxide or the metal sulfate (K$_2$SO$_4$, Rb$_2$SO$_4$ and Cs$_2$SO$_4$) to convert ammonium sulfate into metal sulfate or metal pyrosulfate (K$_2$S$_2$SO$_7$, Rb$_2$S$_2$SO$_7$ and Cs$_2$S$_2$SO$_7$).

10. The method of claim 1, wherein the oxygen production step consists of the steps of:

a first thermochemical step for the reaction of ammonium sulfate with metal oxide or a metal sulfate; and a second thermochemical step for producing oxygen from decomposition of one of the metal sulfate and the metal pyrosulfate using a concentrated solar radiation.

11. The method of claim 10, wherein the solar radiation comprises the steps of:

the first thermochemical step according to (NH$_4$)$_2$SO$_4$+ ZnO→2NH$_3$(g)+H$_2$O(g) ZnSO$_4$(s) at approximately 252° C.; and the second thermochemical step according to ZnSO$_4$(s)→ SO$_2$(g)+ZnO(s)+½O$_2$(g) at approximately 852° C.; and driving the first and second thermochemical steps using a concentrated thermal energy receiver for receiving solar radiation for production of O$_2$ via decomposition of metal sulfate MSO$_4$.

12. A MSO$_4$—NH$_3$ cycle method for producing H$_2$ and O$_2$ from a continuous and closed system consisting essentially of the steps of:

feeding a 1 M aqueous (NH$_3$)$_4$SO$_3$ solution into a photoctalytic reactor or electrochemical reactor to oxidize the aqueous (NH$_3$)$_4$SO$_3$ into aqueous (NH$_3$)$_2$SO$_4$ and reduce water to hydrogen;

mixing the resulting aqueous (NH$_3$)$_2$SO$_4$ with metal oxide to form a slurry, wherein the ratio of metal oxide to ammonium sulfate is maintained at 1.5 to 1;

heating the slurry of aqueous (NH$_4$)$_2$SO$_4$ and metal oxide in the low temperature reactor to produce a gaseous mixture of NH$_3$ and H$_2$O and metal sulfate;

heating solid ZnSO$_4$ at a high temperature reactor to produce a gaseous mixture of SO$_2$ and O$_2$ and solid ZnO, wherein the heating rate is maintained at 5° C./min to 50° C./min;

recycling ZnO back to mix with aqueous (NH$_4$)$_2$SO$_4$ solution to a slurry that is be fed into a low temperature reactor;

mixing the gaseous mixture of SO$_2$ and O$_2$ with NH$_3$ and H$_2$O in an absorber to separate O$_2$ from aqueous (NH$_4$)$_2$SO$_3$ solution to produce O$_2$;

recycling the ammonium sulfite back to the photoreactor to close the water splitting cycle to produce both gaseous H$_2$ and gaseous O$_2$ as the only products output from the continuous and closed ZnSO$_4$—NH$_3$ cycle; and wherein the method implements a closed water splitting cycle, and wherein only the water is consumed by the closed water splitting cycle.

13. The method of claim 12, further comprising the step of:

introducing a cold water stream into the closed system to recover heat from the high temperature reactor to generate a hot stream; and using the hot steam to drive a microturbine to produce electricity.

14. The method of claim 12, wherein the slurry of aqueous (NH$_4$)$_2$SO$_4$ and ZnO(s) is heated in a low temperature reactor at temperature of approximately 300° C. to produce the gaseous mixture of NH$_3$ and H$_2$O and solid product of ZnSO$_4$.

15. The method of claim 12 wherein the solid ZnSO$_4$ is heated to approximately 1000° C. at the high temperature reactor to produce the gaseous mixture of SO$_2$ and O$_2$ and ZnO(s).

16. A M$_2$S$_2$O$_7$—NH$_3$ hybrid continuous and closed photo and thermo-chemical water splitting cycle method consisting essentially of the steps of:

receiving a solar radiation;

using the solar radiation for the production of hydrogen in a photoreactor via photochemical oxidation of aqueous ammonium sulfite solution to produce hydrogen;

using the solar radiation for the production of oxygen including introducing a metal sulfate ($K_2SO_4$, $Rb_2SO_4$ and $Cs_2SO_4$) to convert ammonium sulfate into metal pyrosulfate ($K_2S_2O_7$, $Rb_2S_2O_7$ and $Cs_2S_2O_7$), wherein the ratio of metal oxide or metal sulfate to ammonium sulfate is maintained at 1.5 to 1;

decomposing the metal pyrosulfate for the production of $O_2$, wherein the heating rate is maintained at 5° C./min to 50° C./min;

supplying the regenerated ammonium sulfite to the photoreactor, and wherein the method implements a closed water splitting cycle, and wherein only the water is consumed by the closed water splitting cycle.

* * * * *